US012810264B2

(12) United States Patent
Mehta et al.

(10) Patent No.: US 12,810,264 B2
(45) Date of Patent: Nov. 24, 2026

(54) PERSON-TO-PERSON TRANSFERS

(71) Applicant: Coinbase, Inc., Oakland, CA (US)

(72) Inventors: Meghna Mehta, New York City, NY (US); Anirudh Sunkineni, Austin, TX (US); Pierre-Etienne Corriveau, Montreal (CA); Karsten Froemming, Seattle, WA (US); Ricardo Han, São Paulo (BR)

( * ) Notice: Subject to any disclaimer, the term of this patent is extended or adjusted under 35 U.S.C. 154(b) by 31 days.

(21) Appl. No.: 18/412,126

(22) Filed: Jan. 12, 2024

(65) Prior Publication Data

US 2025/0232272 A1 Jul. 17, 2025

(51) Int. Cl.

| | |
|---|---|
| ***G06Q 20/10*** | (2012.01) |
| ***G06Q 20/22*** | (2012.01) |
| ***G06Q 20/36*** | (2012.01) |
| ***G06Q 20/38*** | (2012.01) |

(52) U.S. Cl.

CPC .......... *G06Q 20/10* (2013.01); *G06Q 20/223* (2013.01); *G06Q 20/3678* (2013.01); *G06Q 20/389* (2013.01)

(58) Field of Classification Search

CPC .. G06Q 20/10; G06Q 20/223; G06Q 20/3678; G06Q 20/389

See application file for complete search history.

(56) References Cited

U.S. PATENT DOCUMENTS

| | | | | |
|---|---|---|---|---|
| 11,893,637 B2 * | 2/2024 | Bleznak | ............. | G06Q 20/3678 |
| 12,323,530 B2 * | 6/2025 | Heart | .................... | H04L 9/3255 |
| 2021/0398211 A1 * | 12/2021 | Maathur | .............. | G06Q 20/401 |
| 2023/0004423 A1 * | 1/2023 | Fatahi | .................. | G06Q 20/065 |
| 2023/0368296 A1 * | 11/2023 | Hara | .................... | G06Q 20/389 |
| 2024/0007309 A1 * | 1/2024 | Dowling | ................... | H04L 9/50 |
| 2024/0305453 A1 * | 9/2024 | Alsahnawi | ............. | G06N 5/022 |
| 2025/0029094 A1 * | 1/2025 | Zarick | ................ | G06Q 20/3678 |
| 2025/0156828 A1 * | 5/2025 | Sliwka | ................... | G06Q 20/02 |

FOREIGN PATENT DOCUMENTS

| | | | | |
|---|---|---|---|---|
| KR | 2334931 B1 * | 12/2021 | ........... | G06Q 20/065 |

* cited by examiner

*Primary Examiner* — Jalatee Worjloh
(74) *Attorney, Agent, or Firm* — Holland & Hart LLP

(57) ABSTRACT

Methods, systems, and devices for person-to-person transfers are described. A user device may receive from a requestor, a request for transfer of a first amount of a first token to the requestor. A blockchain address application associated with the requestee, may display respective indications of one or more second tokens in the blockchain address application, where the one or more second tokens are different than the first token. The blockchain address application may receive user input including a selection of a second token of the one or more second tokens. The blockchain address application may transmit, after receiving the user input, a message that causes the requestee to transfer a second amount of the second token and the requestor to receive the first amount of the first token.

18 Claims, 11 Drawing Sheets

PERSON-TO-PERSON TRANSFERS

FIELD OF TECHNOLOGY

The present disclosure relates generally to data management, including techniques for person-to-person transfers.

BACKGROUND

Blockchains and related technologies may be employed to support recordation of ownership of digital assets, such as cryptocurrencies, fungible tokens, non-fungible tokens (NFTs), and the like. Generally, peer-to-peer networks support transaction validation and recordation of transfer of such digital assets on blockchains. Various types of consensus mechanisms may be implemented by the peer-to-peer networks to confirm transactions and to add blocks of transactions to the blockchain networks. Example consensus mechanisms include the proof-of-work consensus mechanism implemented by the Bitcoin network and the proof-of-stake mechanism implemented by the Ethereum network. Some nodes of a blockchain network may be associated with a digital asset exchange, which may be accessed by users to trade digital assets or trade a fiat currency for a digital asset.

DETAILED DESCRIPTION

Figure 1:
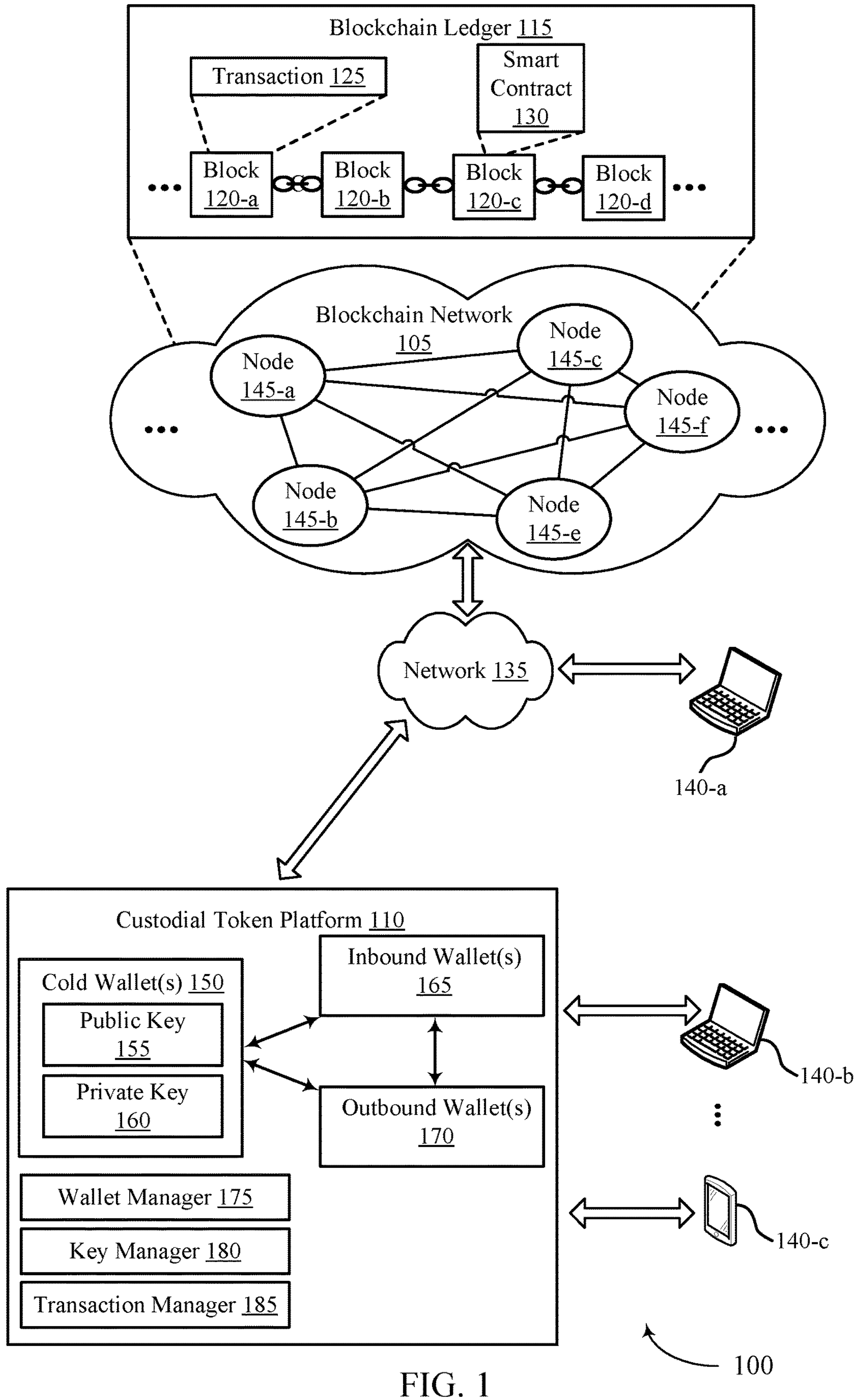
FIG. 1 illustrates an example of a computing environment that supports person-to-person transfers in accordance with aspects of the present disclosure.

In some cases, users access various applications to pay or request money or other types of funds from other users, such as for a payment for cab fare, dinning bills, rent, and other social activities. As such, users may send or receive requests for payment (e.g., peer-to-peer (P2P) transactions) using an application. However, the user requesting payment (e.g., requestor) may send the request for payment in a currency that may be unavailable to the receiving user (e.g., requestee) or the requestor may prefer to pay in a different currency. As such, the requestee may be unable to complete the payment in the requested currency for the requestor or the requestor may receive payment in a currency different than the one requested.

Techniques described herein address these difficulties by providing a technique for P2P payment transactions using multiple currencies when transferring funds from the requestee's account to the requestor's account. A requestor (e.g., user sending a request for a P2P transaction) may access an application, such as an application associated with a blockchain address, a custodial token platform application, or another P2P payment application that service P2P payments, and input information to initiate a P2P request to a requestee (e.g., user receiving the request for the P2P transaction). The requestee may receive a request for a quantity of currency in a first currency (e.g., United States Dollar Coin (USDC)) from the requestee. The requestee may access a corresponding application (e.g., an instance of the same P2P payment application or a blockchain wallet application) and the application may display one or more options of currency (e.g., Ether (ETH), Bitcoin, Tether, etc.), and at least one of the one or more options may be different than the first currency. The requestee may select a second currency from the one or more options, and the application may transmit a message that causes the requestor's account to be adjusted by the quantity of the currency in the first currency (e.g., increase in USDC in requestor account) and the requestee's account to be adjusted by the quantity of currency in the selected second currency (e.g., decrease in ETH in requestee account). The transfer of funds may be performed on-chain or off-chain with respect to a blockchain. Moreover, in some examples, the one or more options may include currencies available globally based on geographic location of the requestee (e.g., USDC available in the United States). In this manner, the multiple currency options for fulfilling a request may provide flexibility in payment and may result in increased likelihood of the requestee fulfilling the request, increase user engagement with the blockchain address application since the additional payment options may increase the pool of users having funds in the different currency options, as well as increase adaptability as alternative currency options become available. Also, the application may display the second currency equivalence of the first currency (e.g., conversion rate), and viewing the conversion may allow the requestee to easily assess the impact to the requestee's account with respect to the second currency, as well as the conversion rate between the currencies. These and other techniques are described in further detail with respect to the figures.

FIG. 1 illustrates an example of a computing environment 100 that supports displaying of message state for a blockchain message in accordance with aspects of the present disclosure. The computing environment 100 may include a blockchain network 105 that supports a blockchain ledger 115, a custodial token platform 110, and one or more computing devices 140, which may be in communication with one another via a network 135.

The network 135 may allow the one or more computing devices 140, one or more nodes 145 of the blockchain network 105, and the custodial token platform 110 to communicate (e.g., exchange information) with one another. The network 135 may include aspects of one or more wired networks (e.g., the Internet), one or more wireless networks (e.g., cellular networks), or any combination thereof. The network 135 may include aspects of one or more public networks or private networks, as well as secured or unsecured networks, or any combination thereof. The network 135 also may include any quantity of communications links and any quantity of hubs, bridges, routers, switches, ports or other physical or logical network components.

Nodes 145 of the blockchain network 105 may generate, store, process, verify, or otherwise use data of the blockchain ledger 115. The nodes 145 of the blockchain network 105 may represent or be examples of computing systems or devices that implement or execute a blockchain application or program for peer-to-peer transaction and program execution. For example, the nodes 145 of the blockchain network 105 support recording of ownership of digital assets, such as cryptocurrencies, fungible tokens, non-fungible tokens (NFTs), and the like, and changes in ownership of the digital assets. The digital assets may be referred to as tokens, coins, crypto tokens, or the like. The nodes 145 may implement one or more types of consensus mechanisms to confirm transactions and to add blocks (e.g., blocks 120-*a*, 120-*b*, 120-*c*, and so forth) of transactions (or other data) to the blockchain ledger 115. Example consensus mechanisms include a proof-of-work consensus mechanism implemented by the Bitcoin network and a proof-of-stake consensus mechanism implemented by the Ethereum network.

When a device (e.g., the computing device 140-*a*, 140-*b*, or 140-*c*) associated with the blockchain network 105 executes or completes a transaction associated with a token supported by the blockchain ledger, the nodes 145 of the blockchain network 105 may execute a transfer instruction that broadcasts the transaction (e.g., data associated with the transaction) to the other nodes 145 of the blockchain network 105, which may execute the blockchain application to verify the transaction and add the transaction to a new block (e.g., the block 120-*d*) of a blockchain ledger (e.g., the blockchain ledger 115) of transactions after verification of the transaction. Using the implemented consensus mechanism, each node 145 may function to support maintaining an accurate blockchain ledger 115 and prevent fraudulent transactions.

The blockchain ledger 115 may include a record of each transaction (e.g., a transaction 125) between wallets (e.g., wallet addresses) associated with the blockchain network 105. Some blockchains may support smart contracts, such as smart contract 130, which may be an example of a sub-program that may be deployed to the blockchain and executed when one or more conditions defined in the smart contract 130 are satisfied. For example, the nodes 145 of the blockchain network 105 may execute one or more instructions of the smart contract 130 after a method or instruction defined in the smart contract 130 is called by another device. In some examples, the blockchain ledger 115 is referred to as a blockchain distributed data store.

A computing device 140 may be used to input information to or receive information from the computing system custodial token platform 110, the blockchain network 105, or both. For example, a user of the computing device 140-*a* may provide user inputs via the computing device 140-*a*, which may result in commands, data, or any combination thereof being communicated via the network 135 to the computing system custodial token platform 110, the blockchain network 105, or both. Additionally, or alternatively, a computing device 140-*a* may output (e.g., display) data or other information received from the custodial token platform 110, the blockchain network 105, or both. A user of a computing device 140-*a* may, for example, use the computing device 140-*a* to interact with one or more user interfaces (e.g., graphical user interfaces (GUIs)) to operate or otherwise interact with the custodial token platform 110, the blockchain network 105, or both.

A computing device 140 and/or a node 145 may be a stationary device (e.g., a desktop computer or access point) or a mobile device (e.g., a laptop computer, tablet computer, or cellular phone). In some examples, a computing device 140 and/or a node 145 may be a commercial computing device, such as a server or collection of servers. And in some examples, a computing device 140 and/or a node 145 may be a virtual device (e.g., a virtual machine).

Some blockchain protocols support layer one and layer two crypto tokens. A layer one token is a token that is supported by its own blockchain protocol, meaning that the layer one token (or a derivative thereof), may be used to pay transaction fees for transacting using the blockchain protocol. A layer two token is a token that is built on top of layer one, for example, using a smart contract 130 or a decentralized application ("Dapp"). The smart contract 130 or decentralized application may issue layer two tokens to various users based on various conditions, and the users may transact using the layer two tokens, but transaction fees may be based on the layer one token (or a derivative thereof).

The custodial token platform 110 may support exchange or trading of digital assets, fiat currencies, or both by users of the custodial token platform 110. The custodial token platform 110 may be accessed via website, web application, or applications that are installed on the one or more computing devices 140. The custodial token platform 110 may be configured to interact with one or more types of blockchain networks, such as the blockchain network 105, to support digital asset purchase, exchange, deposit, and withdrawal.

For example, users may create accounts associated with the custodial token platform 110 such as to support purchasing of a digital asset via a fiat currency, selling of a digital asset via fiat currency, or exchanging or trading of digital assets. A key management service (e.g., a key manager) of the custodial token platform 110 may create, manage, or otherwise use private keys that are associated with user wallets and internal wallets. For example, if a user wishes to withdraw a token associated with the user account to an external wallet address, key manager 180 may sign a transaction associated with a wallet of the user, and broadcast the signed transaction to nodes 145 of the blockchain network 105, as described herein. In some examples, a user does not have direct access to a private key associated with a wallet or account supported or managed by the custodial token platform 110. As such, user wallets of the custodial token platform 110 may be referred to non-custodial wallets or non-custodial addresses.

The custodial token platform 110 may create, manage, delete, or otherwise use various types of wallets to support digital asset exchange. For example, the custodial token platform 110 may maintain one or more internal cold wallets 150. The internal cold wallets 150 may be an example of an offline wallet, meaning that the cold wallet 150 is not directly coupled with other computing systems or the network 135 (e.g., at all times). The cold wallet 150 may be used by the custodial token platform 110 to ensure that the custodial token platform 110 is secure from losing assets via hacks or other types of unauthorized access and to ensure that the custodial token platform 110 has enough assets to cover any potential liabilities. The one or more cold wallets 150, as well as other wallets of the blockchain network 105 may be implemented using public key cryptography, such that the cold wallet 150 is associated with a public key 155 and a private key 160. The public key 155 may be used to publicly transact via the cold wallet 150, meaning that another wallet may enter the public key 155 into a transaction such as to move assets from the wallet to the cold wallet 150. The private key 160 may be used to verify (e.g., digitally sign) transactions that are transmitted from the cold wallet 150, and the digital signature may be used by nodes 145 to verify or authenticate the transaction. Other wallets of the custodial token platform 110 and/or the blockchain network 105 may similarly use aspects of public key cryptography.

The custodial token platform 110 may also create, manage, delete, or otherwise use inbound wallets 165 and outbound wallets 170. For example, a wallet manager 175 of the custodial token platform 110 may create a new inbound wallet 165 for each user or account of the custodial token platform 110 or for each inbound transaction (e.g., deposit transaction) for the custodial token platform 110. In some examples, the custodial token platform 110 may implement techniques to move digital asset between wallets of the digital asset exchange platform. Assets may be moved based on a schedule, based on asset thresholds, liquidity requirements, or a combination thereof. In some examples, movements or exchanges of assets internally to the custodial token platform 110 may be "off-chain" meaning that the transactions associated with the movement of the digital asset are not broadcast via the corresponding blockchain network (e.g., blockchain network 105). In such cases, the custodial token platform 110 may maintain an internal accounting (e.g., ledger) of assets that are associated with the various wallets and/or user accounts.

As used herein, a wallet, such as inbound wallets 165 and outbound wallets 170 may be associated with a wallet address, which may be an example of a public key, as described herein. The wallets may be associated with a private key that is used to sign transactions and messages associated with the wallet. A wallet may also be associated with various user interface components and functionality. For example, some wallets may be associated with or leverage functionality for transmitting crypto tokens by allowing a user to enter a transaction amount, a receiver address, etc. into a user interface and clicking or activating a UI component such that the transaction is broadcast via the corresponding blockchain network via a node (e.g., a node 145) associated with the wallet. As used herein, "wallet" and "address" may be used interchangeably.

In some cases, the custodial token platform 110 may implement a transaction manager 185 that supports monitoring of one or more blockchains, such as the blockchain ledger 115, for incoming transactions associated with addresses managed by the custodial token platform 110 and creating and broadcasting on-blockchain transactions when a user or customer sends a digital asset (e.g., a withdrawal). For example, the transaction manager 185 may monitor the addressees of the customers for transfer of layer one or layer two tokens supported by the blockchain ledger 115 to the addresses managed by the custodial token platform 110. As another example, when a user is withdrawing a digital asset, such as a layer one or layer two token, to an external wallet (e.g., an address that is not managed by the custodial token platform 110 or an address for which the custodial token platform 110 does not have access to the associated private key), the transaction manager 185 may create and broadcast the transaction to one or more other nodes 145 of the blockchain network 105 in accordance with the blockchain application associated with the blockchain network 105. As such, the transaction manager 185, or an associated component of the custodial token platform 110 may function as a node 145 of the blockchain network 105.

As described herein, the custodial token platform may implement and support various wallets including the inbound wallets 165, the outbound wallets 170, and the cold wallets 150. Further, the custodial token platform 110 may implement techniques to maintain and manage balances of the various wallets. In some examples, the balances of the various wallets are configured to support security and liquidity. For example, the custodial token platform 110 may implement transactions that move crypto tokens between the inbound wallets 165 and the outbound wallets 170. These transactions may be referred to as "flush" transactions and may occur on a periodic or scheduled basis.

As described herein, various transactions may be broadcast to the blockchain ledger 115 to cause transfer of crypto tokens, to call smart contracts, to deploy smart contracts etc. In some examples, these transactions may also be referred to as messages. That is, the custodial token platform 110 may broadcast a message to the blockchain network 105 to cause transfer of tokens between wallets managed by the custodial token platform 110 to cause transfer of tokens from a wallet managed by the custodial token platform 110 to an external wallet, to deploy a smart contract (e.g., a self-executing program), or to call a smart contract.

Additionally, a user may access the custodial token platform 110 via an application (e.g., blockchain address application) to purchase, sell, exchange, or trade digital assets, such as cryptocurrencies, crypto tokens, or the like. The purchasing, selling, exchanging, or otherwise performing a transaction, may involve a user to send a request (e.g., requestor) to another user (e.g., requestee). For example, a requestor may send a payment request, for example, in a blockchain address application that is associated with the custodial token platform 110. The request for payment may be in a first currency, such as USDC. However, the requestee receiving the request may not have enough balance in USDC, USDC may be unavailable to the requestee, or the requestee may prefer to fulfill the payment request using a second currency that is different than the first currency. Thus, the requestee may be unable or unwilling to complete the requested payment in the requested first currency.

Techniques described herein address these difficulties by providing a technique for performing the P2P transaction using various currency options. For example, performing the P2P transactions in the application may include receiving a request for a quantity of currency in the first currency (e.g., USDC). The blockchain address application associated with the requestee may display one or more options of currency (e.g., Ether (ETH), Bitcoin, Tether, etc.), and at least one of the one or more options may be different than the first currency. The requestee may select a second currency from the one or more options (e.g., ETH), and the application transmit a message that causes the requestor's account to be adjusted by the quantity of the currency in the first currency (e.g., increase in USDC in requestor account) and the requestee's account to be adjusted by the quantity of currency in the selected second currency (e.g., decrease in ETH in requestee account). The transfer may be performed on-chain or off-chain with respect to the blockchain ledger 115. Moreover, in some examples, the one or more options may include currencies available globally based on the geographic location associated with the requestee or the requestor (e.g., USDC available the United States). Also, in some examples, in response to receiving the selection of the second currency, the application may display the quantity of currency in the second currency that corresponds to the quantity of currency in the first currency.

The application enabling one or more currency options for fulfilling a payment request may provide flexibility in payment options and may result in increased likelihood of the requestee fulfilling the request. Moreover, enabling one or more currency options for fulling a payment request may increase user engagement with the application since the additional payment options may increase the pool of users having funds in the different currency options. The application enabling one or more currency options may also increase adaptability as alternative currency options become available overtime and users have the ability to fulfill requests using the various currency options, including the new alternative currency options. Also, the application displaying the currency amount in the first currency along with the second currency (e.g., the one or more currency options) when fulfilling the request, indicating the second currency equivalence of the first currency, may allow the requestee to easily assess the impact to the requestee's account with respect to the second currency, as well as the conversion rate between the currencies. These and other techniques are described in further detail with respect to the figures.

As described, a user may access a custodial token platform 110 to purchase, sell, exchange, or trade digital assets, such as cryptocurrencies, crypto tokens, or the like. A custodial token platform may support various types of user wallets for deposits, withdrawals, and storage. For example, the custodial token platform may generate wallets for user deposits of crypto tokens to accounts associated with the user. Accordingly, the P2P payment techniques may be supported via an application for the custodial token platform 110, such that a user may access the user account and request and fulfill P2P payments. Thus, the P2P payment techniques described herein may be described with respect to facilitation of P2P payments using a blockchain address application that may or may not be associated with the custodial token platform 110. However, it should be understood that the application may be different from a blockchain wallet application or may not be associated with the custodial token platform 110 specifically.

Figure 2:
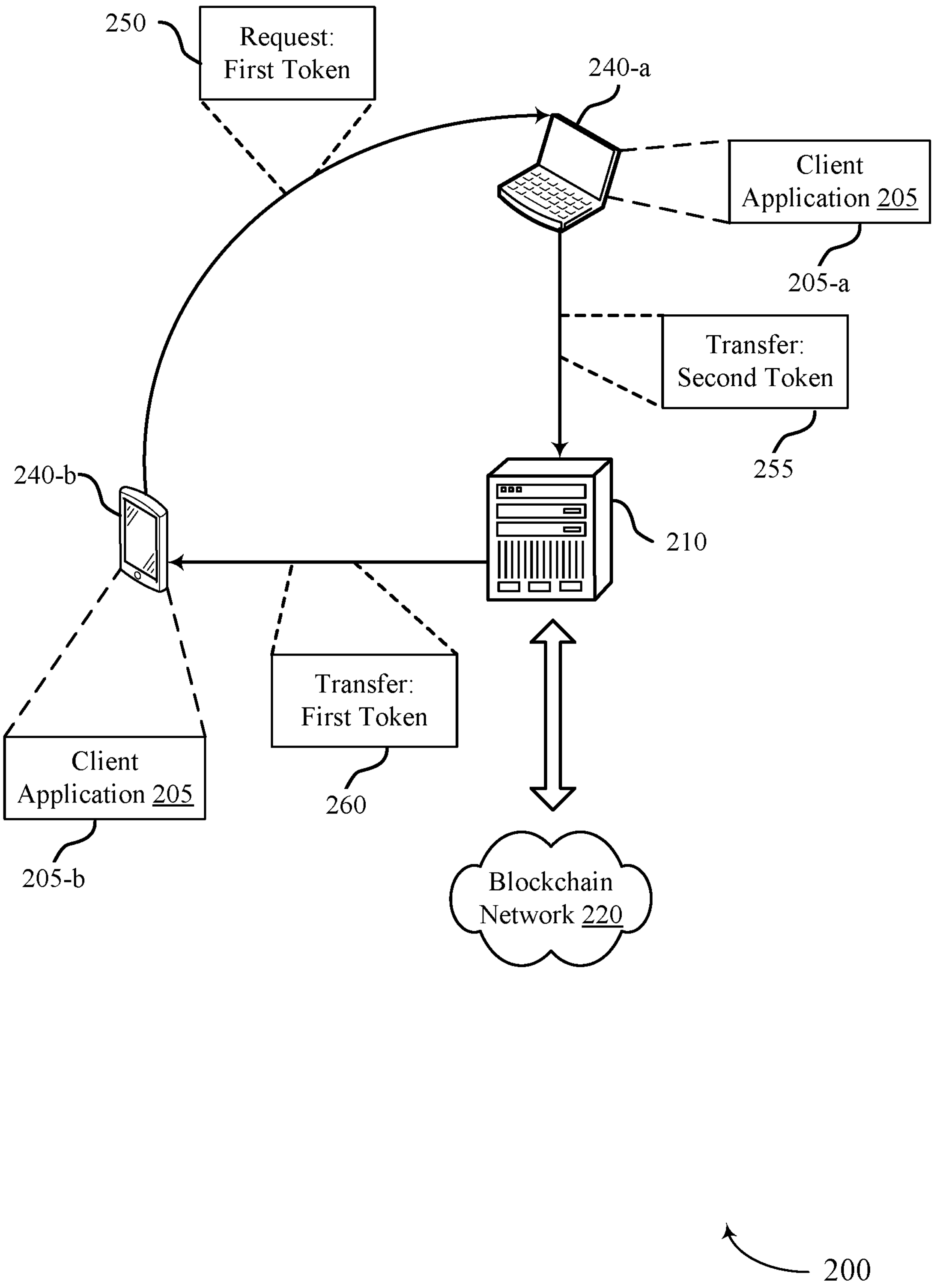
FIG. 2 shows an example of a computing environment that supports person-to-person transfers in accordance with aspects of the present disclosure.

FIG. 2 shows an example of a computing environment 200 that supports P2P transactions in accordance with aspects of the present disclosure. The computing environment 200 includes one or more servers 210, a client application 205, and a first user device 240-*a* and a second user device 240-*b* that are associated with and communicate with the client application 205. For example, the client application 205 may be installed on the user devices 240 for initiating P2P requests and may communicate with the servers 210 to obtain information for executing and completing the P2P transactions. The servers 210 may be an example of one or more servers supporting the custodial token platform 110 as described with respect to FIG. 1, and the user devices 240 may be examples of the computing devices 140 as described with respect to FIG. 1. Although the discussions described herein relate to cryptocurrency with respect to crypto tokens and stablecoins, the cryptocurrency may include a variety of tokens, coins, digital currency, and the like.

The client application 205 may be an example of an application that is configured to access the custodial token platform 110 of FIG. 2 or may be an example of another application that supports facilitation of P2P transactions as described herein. In some examples, the client application 205 is a blockchain wallet application (e.g., a custodial wallet application) that is used to facilitate transfers via and interact with one or more blockchain networks (e.g., a blockchain network 220).

The servers 210 may communicate with the client application 205 to facilitate and execute P2P transactions. For example, the client application 205 may include blockchain wallet addresses associated with the requestor and the requestee for P2P transactions, such as between the first user device 240-*a* and the second user device 240-*b*. The servers 210 may support various transactions performed in the client applications 205 of the user devices 240 or as offered by the custodial token platform 110 of FIG. 1. In some examples, the servers 210 may store or access account-related data, wallet addresses, state (e.g., status) of P2P transaction, as well as support other P2P-related transactions for various purposes. In some examples, the servers 210 may support storing and subscribing to data associated with a P2P transaction in order to provide state (e.g., pending, completed, failed, etc.) related to the P2P transactions. The subscribed data and states may trigger notifications to be displayed at the client applications 205.

In some examples, the client application 205 may leverage one or more application programming interfaces (APIs), for example, a P2P request API. A P2P request API associated with client application 205 may handle facilitation of and execution of a P2P request. The service provided by the P2P request API may allow users to look up other users by email addresses, mobile numbers, user identifications (IDs) associated with the client application 205, and other identification methods, for the P2P requests. The P2P request API may also provide the service of delivering the notifications (e.g., using growth notification service (GNS)) to initiate notifications (e.g., for delivery thorough the GNS). In some examples, the one or more APIs may include a transfer event API associated with client application 205 to handle notifications of updates to a transfer state, such as for tracking metadata of the P2P request to determine whether the request was successfully completed or if it failed.

In some examples, the client application 205 may support users that do not have or are not associated with the client application 205. For example, the client application 205 may support P2P requests using a mobile number-based request (e.g., off-chain request). Thus, users that do not have accounts for the client application 205 may still participate in the P2P transactions, such as by phone number. In such examples, the client application 205 may rely on P2P requestee service and a P2P claims service in order to verify a mobile number-based request and to complete the claim process during a new user onboarding.

The client application 205 may also validate requests, such as the requested amount, requested currency, requestee identifiers (e.g., email address or phone number in correct format), that a request note is provided (e.g., reason for request and in correct format), and that the user ID for the requestor and/or requestee is not a spam list. The client application 205 may also verify that for cancellation, fulfillment, or the declining of a request, that the user has the appropriate privileges for the request and that the request is in a valid state (e.g., requested or created state based on privileges) before fulfilling the request. In some examples, some requests may be limited, for example, per day, per hour, per week, and so forth (e.g., no more than 10 requests in a 24 hours). A user may also be limited to a quantity of reminders or requests, for example, per day.

As illustrated in FIG. 2, a user may access the client application 205-*b* to initiate a P2P payment, as described herein. For example, the user may enter a phone number, user identifier, or the like, associated with the requestee, into the client application. The user may also select a token (e.g., first token) in which the user wishes to be paid. The user may also enter the amount of the first token. After entering such information, the client application 205-*b* may facilitate a request 250 for the first token. As described herein, communication of the request may be facilitated via the server 210, one or more APIs, or both.

If the user device 240-*a* of the requestee has the client application 205-*a* or an account with the client application 205-*b*, then a notification of the request 250 may be displayed or otherwise indicated to the requestee user via the user device 240-*a*. If the requestee does not have an account or the client application, the user may be notified via email, SMS message, or the like and the requestee may be provided an option to download the application, create an account, etc. As described herein, the requestee may not wish to fulfill the request 250 via the first token. Accordingly, the requestee may select another token (e.g., a second token). As described herein, the amount of the second token to be deducted or transferred to fulfill the amount of the first token (e.g., based on a current conversion ratio) may be displayed to the requestee.

After initiation of fulfillment via the second token, the server 210, the client application 205-*b*, one or more APIs or a combination thereof may facilitate the fulfillment. For example, an indication of transfer 255 (e.g., a first message) may be communicated to the server 210 (e.g., via one or more APIs). In the case of an on-chain transaction, the server 210 may initiate an exchange of the second token for the requested amount of the first token via a decentralized exchange (e.g., on the blockchain network 220) or via a centralized exchange (e.g., the custodial token platform 110). For example, the user device 240-*a* may transmit one or more messages (e.g., API requests) that causes one or more blockchain messages to be broadcast (e.g., by the server 210) via the blockchain network 220 to facilitate the exchange and transfer to the requestee's wallet address. Thus, the first token may then be transferred (e.g., via transfer 260) to the user via an on-chain transaction using blockchain network 220. In the case of an off-chain transaction, the server 210 may deduct the amount of the second token from the user account of the requestee and add an amount of the first token to the user account of the requestor.

Figure 3:
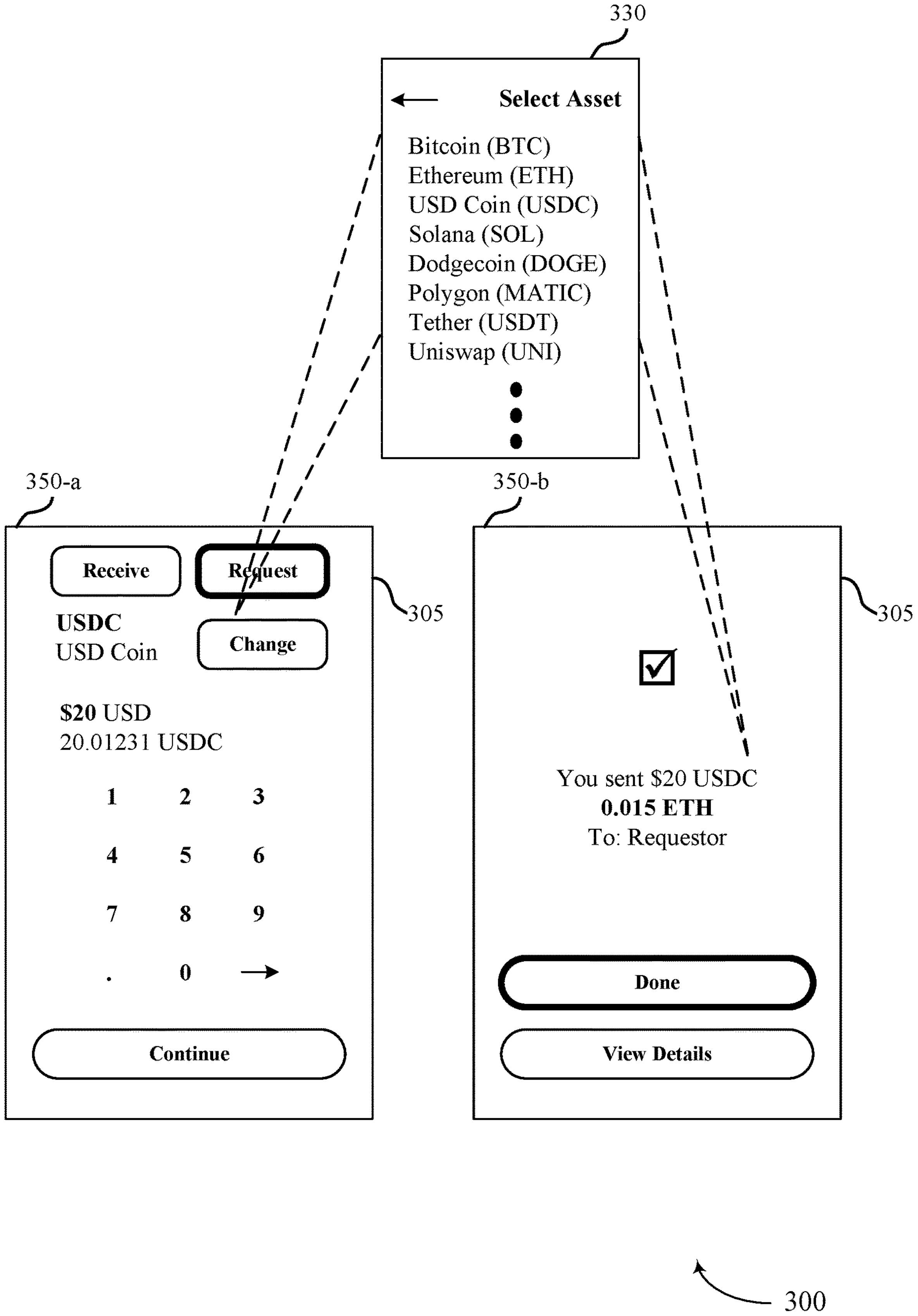
FIG. 3 shows an example of a peer-to-peer request and fulfillment that supports person-to-person transfers in accordance with aspects of the present disclosure.

FIG. 3 shows an example of a P2P request and fulfillment 300 that supports P2P payment transactions in accordance with aspects of the present disclosure. A user interface (e.g., user interface 350-*a*, user interface 350-*b*) of a client application 305 may be updated during the pending transaction and provide an indication accordingly at a user interface (e.g., user interface 350-*a*, user interface 350-*b*). The client application 305 may be an example of the client application 205 as described with respect to FIG. 2. One or more APIs may facilitate performing the P2P transactions discussed herein with respect to the client application 305 (e.g., get request API, create send request API, commit send request API, etc.).

A user (e.g., requestor) may access the user interface 350-*a* of the client application 305, and the user interface 350-*a* may display a user interface component to create a new payment request. Information for the request may include the requested quantity of currency, a note for the request, and a requestee email address, mobile number, or another ID associated with the requestor, or other information. Initiation of a new payment request may cause the new request to be in a created state. When the requestor creates or activates a payment request, a notification may be sent to the requestee (e.g., based on transmission of one or more messages, as described herein). When the requestee has a user account associated with the client application 305, in-app notification, email notification, or a push notification may be sent to the requestee. If the requestee does not have a user account associated with the client application 305, an email notification or a text message notification may be sent to the requestee based on input provided by the requestor.

As an example, the requestor may create a request for $20.00 in USD, which may be equivalent to 20.01231 USDC based on conversion rates and/or fees. The user interface 350-*a* may display a default asset associated with the requestor or the client application 305 (e.g., USDC) with the exchange rate (e.g., 20.01231 USDC for $20). The exchange rate may be fetched by APIs associated with the client application 305. In some examples, the default account may be an asset with the largest balance associated with the requestor or the client application 305. Rather than increasing in USDC balance associated with the requestor's account upon fulfillment of the request, another asset may be selected for the payment request.

The requestor may select a "change" user interface component (e.g., a button) to select a different asset conversion option for the request. Upon selection to change the currency, a list of currency options 330 may appear on the user interface 350-*a*. The list of currency options 330 may include various currency options globally available and/or based on the geographic location of the requestor. The options may include Bitcoin (BTC), ETH, USDC, Solana (SOL), Dodgecoin (DODGE), Polygon (MATIC), Tether (USDT), Uniswap (UNI), etc.

In this example, the requestor selects $20, equivalent to 20.01231 USDC, for the request (as indicated the bolded box). Once the requestor submits a request for the request for payment, an API of the client application 305 may transmit a API request to initiate creation of the P2P payment request. The P2P payment request may have a state of "created" that transitions to a state of "requested" once a user is associated with the request. A valid user may be identified based on the requestee identifier (e.g., email) passed in by the requester. After identification, the request may transition to the "requested" state and the user ID may be populated in the request. Request "created" notifications may be deliver to the requestee. The state of the P2P may be maintained by the application 305 and/or a server (e.g., a server 210) associated with the application 305.

The requestee may receive the request in a payment request notification, and the requestee may be able to select the request to view details related to the request. The payment request may be fulfilled or declined. In some examples, the requestor may cancel the request or accept the payment request after the payment request is in the "requested" or "created" state. If the requestee cancels the request, the request may transition to a terminal "canceled" state and cancel notifications may be delivered to the requestee.

The requestee may accept the payment request after the payment request is in the "requested" state. Once the payment request is accepted, the request may transition to a "processing" state. The user interface 350-*b* of the client application 305 of the requestee may display an indication of options to fulfill the request, such as the default asset or option of assets associated with the requestee's account to fulfill the payment request. For example, the user interface 350-*b* may display that the $20 payment request can be paid with or is equivalent to 0.015 ETH, which may be the default asset or selected asset. The requestee may change the asset from ETH used to pay the $20 using the list of currency options 330 or a similar list in the user interface 350-*b*. The requestee may select a "view details" button to view details related to the request, such as payment amount requested, date request was received, requestor's information, asset balances of the requestee to fulfill the request, etc. The requestee may select a "done" button to complete the payment (e.g., to pay $20 to the requestor's account using 0.015 ETH from the requestee's account).

A successful transfer event notification may be published for the request when the payment exists in the "processing" state and the request ID matches metadata on the transfer. The successful transfer of $20 as 20.01231 USDC to the requestor's account may cause the request to transition to a "fulfilled" state, and a corresponding request fulfilled notification may be deliver to the requestor.

In some examples, a failed transfer event notification may be published for a request when the payment request exists in "processing" state and the request ID matches the metadata on the transfer, but the process payment transfer fails. The request may transition to a "fulfilled" state and a corresponding failed notification may be delivered to the requestor. For example, the client application 305 may check the requestee information using the ID, such as an email address. In case that the ID is not a valid ID (e.g., not a valid email address), the request may result in an error. If the lookup is successful, the notifications for the requestee may be queued. A new user of the client application 305 may be able to claim their requests through an account checklist process. In some examples, IDs (e.g., mobile numbers) that map to multiple user IDs may be processed through a claims service to disambiguate the user and route the request accordingly.

In some examples, the requestee may decline a payment request when the payment request is in the "requested" state, causing the request to transition to a "declined" state. Request declined notifications may be delivered to the requestor when the requestee declines the payment request. Accordingly, a request may start in a "created" state after creating a request and before associating the request with a requestee's user ID. Once the request is associated with the requestee's user ID, the P2P request may transition to a "requested" state and deliver the corresponding notifications to the requestee. When the "requested" state request is fulfilled by the requestee, the request may transition to an intermediate "processing" state before transitioning to a terminal "fulfilled" or "failed" state based on the result of the P2P. A request may also be canceled by the requestor when the request is in the "created" or "requested" state.

Figure 4:
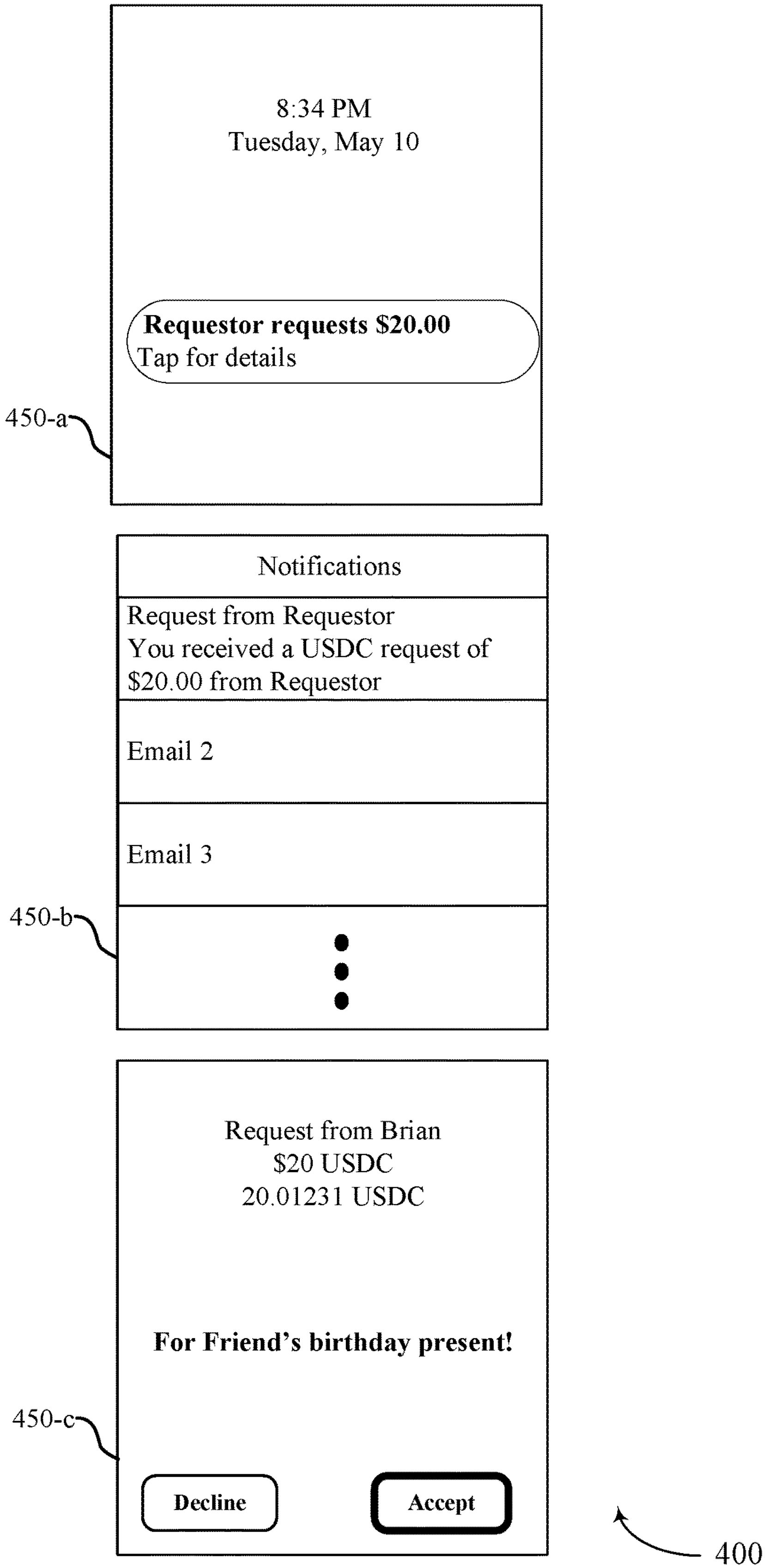
FIG. 4 shows an example of a state notification that supports person-to-person transfers in accordance with aspects of the present disclosure.

FIG. 4 shows an example of a state notification 400 that supports P2P transactions in accordance with aspects of the present disclosure. The state notifications 400 may include a first user interface 450-*a* for a push notification, a second user interface 450-*b* for an in-application notification, and a third user interface 450-*c* for a request screen notification. In some examples, the notifications on the user interface 450-*a*, 450-*b*, 450-*c*, or any combination thereof may occur in response to a trigger event, such as a change in request state, change in asset balances, etc.

The first user interface 450-*a* may indicate a push notification that includes an alert or notification generated by an in-application notification center, which may be pushed to a locked or unlocked screen of a user device. The push notification may also be associated with an application, such as the application 205 described with respect to FIG. 2 and the application 305 as described with respect to FIG. 3. For example, by selecting the push notification at the first user interface 450-*a*, the user may be redirected to the request or be able to view request details within the application or to a request screen associated with the application.

The second user interface 450-*b* may include a notification for a request state within the application based on the triggering event. The in-application notification may be generated by the in-application center. The in-application center may be associated with the request screen of the third user interface 450-*c*, and may provide a notification for the request while the user is navigating within the application.

Figure 5:
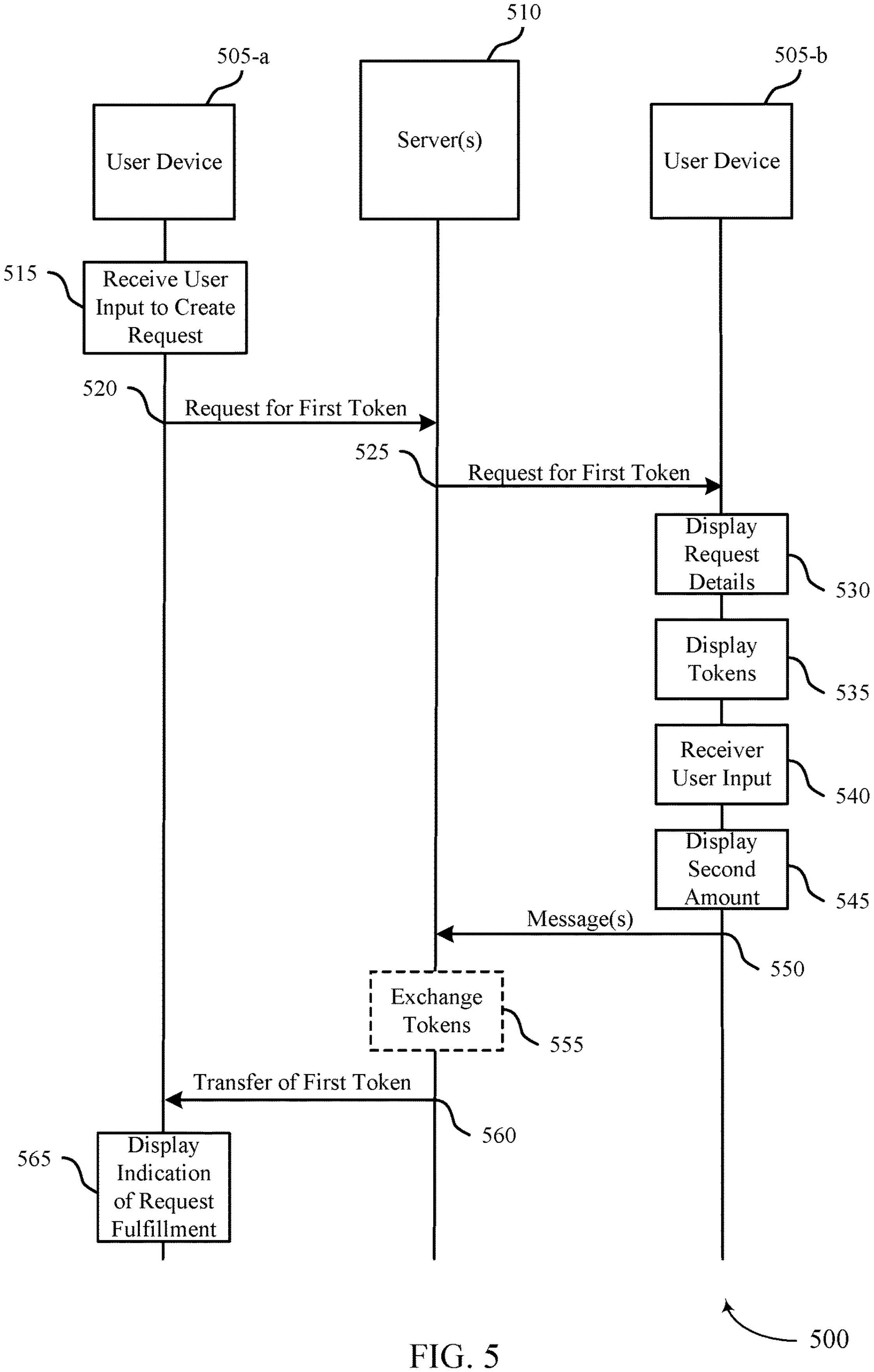
FIG. 5 shows an example of a process flow that supports person-to-person transfers in accordance with aspects of the present disclosure.

FIG. 5 shows an example of a process flow 500 that supports person-to-person transfers in accordance with aspects of the present disclosure. The process flow 500 includes a user device 505-*a*, a user device 505-*b*, and one or more servers 510. The user device 505-*a*, the user device 505-*b*, or both may be used to access a client application (e.g., a blockchain wallet or address application), such as the application described with respect to FIGS. 2 through 4. The user devices 505 may be examples of the corresponding user devices described with respect to FIGS. 1 and 2, and the server 510 may be an example of the server 210 of FIG. 2. Although the following description describes the servers 510 as providing information to the user devices 505, the user devices 505 may receive the information from the other user devices 505, a custodial token platform, a blockchain network, other devices associated with the user, etc. In the following description of the process flow 500, the operations between the user devices 505 and the server 510 may be transmitted in a different order than the example order shown, or the operations performed may be performed in different orders or at different times. Some operations may also be omitted from the process flow 500, and other operations may be added to the process flow 500. The user device 505-*a* may be a device associated with a requestor, and the user device 505-*b* may be a device associated with a requestee.

At 515, the user device 505-*a* (e.g., via the client application) may receive user input to create a P2P payment request. The user may activate a request button and enter information associated with the request, such as an identifier of the requestee (e.g., blockchain address, phone number, email, user identifier, account name), payment token, amount, notes, etc. After entering such information, the user device 505-*a* (e.g., the client application), at 520 may transmit one or more messages (e.g., such as API requests) to the server 510, and the server may facilitate initiation of the request by transmitting one or more request messages to the user device 505-*b* at 525.

That is, at 525, the user device 505-*b* may receive, a request for transfer of a first amount of a first token (e.g., USDC) to the requestor. Receiving the request may be based on the request including a phone number associated with the requestee, an email address associated with the requestee, or both. In some examples, receiving the request may include receiving, at the user device 540, an email or cellular message that is indicative of the requested first amount and the requestor and includes an indication of the application (e.g., blockchain address application) that is used to complete the request.

At 530, the user device 505-*b* may display details associated with the request, such as identifier associated with the requester, the amount, the requested token, etc. At 535, the user device 505-*b* may display respective indications of one or more second tokens (e.g., ETH) in the application. The one or more second tokens may be different than the first token and may be displayed based on the requestee being associated with less than the first amount of the first token. That is, if the user of user device 505-*b* does not have enough of (or any of) the requested token, the one or more tokens are displayed such that the user may select another token to pay. In some examples, the one or more second tokens that are displayed are based on a geographic location of the user device 505-*b* (e.g., the requestee), user device 505-*a* (e.g., the requestor), or both.

At 540, the user device 505-*b* may receive a selection of a second token of the one or more second tokens. In some examples, at 545, the user device 505-*b* associated with the requestee and in response to receiving the selection of the second token, may display the second amount of the second token that corresponds to the first amount of the first token, where the second amount is based at least in part on a current conversion ratio between the second token and the first token. In some examples, the amount may be displayed for each selectable token (e.g., before selection). The first token, the second token, or both, may be a stablecoin. In some examples, the one or more second tokens may be a stablecoin, a layer 1 token, a layer 2 token, a token supported by a self-executing program on a blockchain network, and/or a centralized digital token.

At 550, the user device 505-*b* may transmit, after receiving input (e.g., selection of token), a message that causes the requestee to transfer a second amount of the selected second token and the requestor to receive the first amount of the first token. In this manner, the request may be fulfilled even if the requestee does not fulfill it using the same currency. In some examples, at 540, transmitting the message may include causing a blockchain message to be broadcast on-chain via one or more blockchain networks associated with the first token, the second token, or both, where the blockchain message may exchange the second amount of the selected second token for the first amount of the first token and transfer the first amount to a blockchain address associated with the requestor. For example, at 555, the user device 505-*b* and/or the server may perform operations (e.g., broadcasting messages) that causes exchange of the second token for the first token. In some examples, at 545, transmitting the message may include transmitting, to the server 510 (e.g., a server supporting a custodial token platform), the message that causes an off-chain transfer of the second amount and receipt of the first amount. Thus, at 560, the server 510 may transmit one or more messages that causes transfer of the first token the user device 505-*a* (e.g., to an account or blockchain wallet accessible via the user device 505-*a*). In some examples, at 565, the user device 505-*a* may display a notification indicating the transfer of the second amount of the second token.

Figure 6:
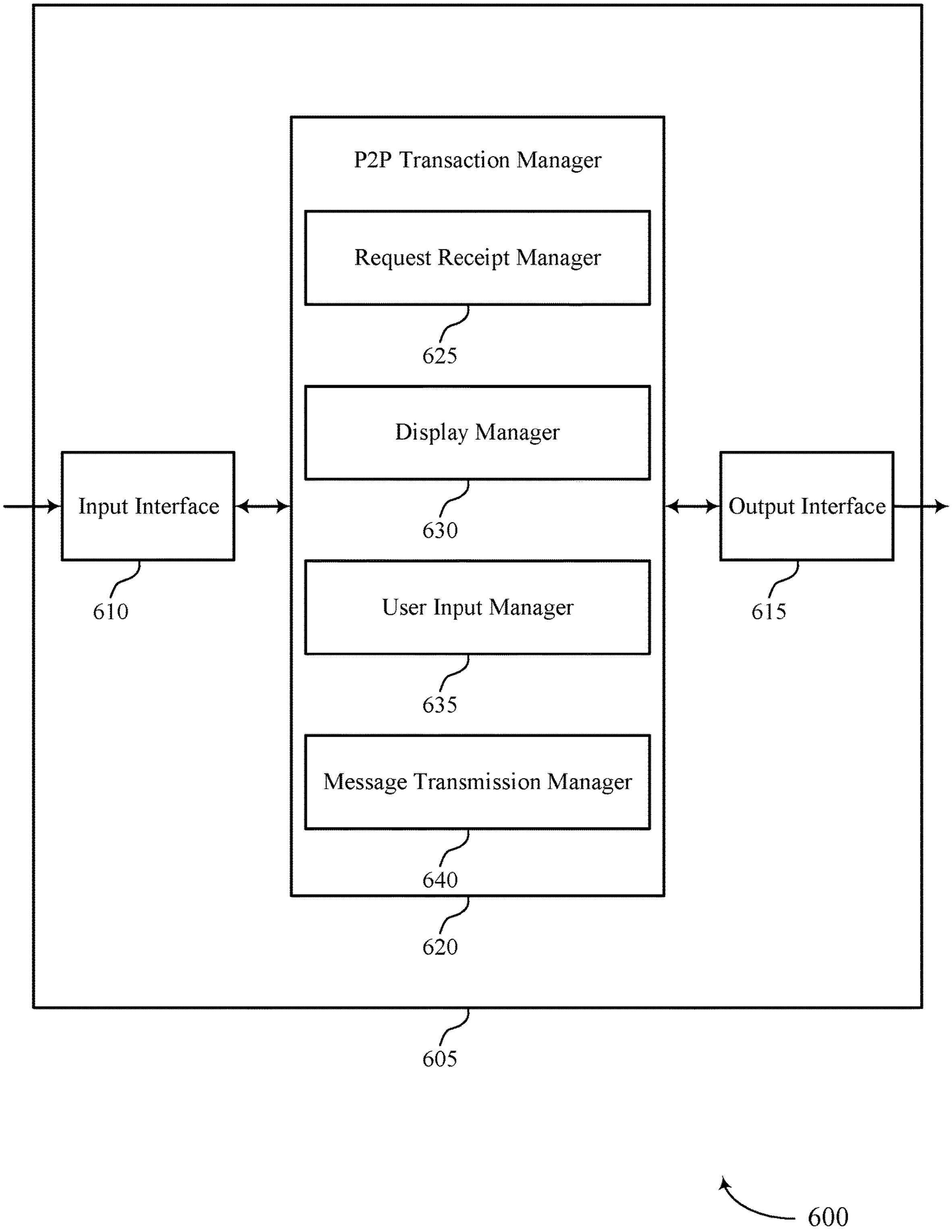
FIG. 6 shows a block diagram of an apparatus that supports person-to-person transfers in accordance with aspects of the present disclosure.

FIG. 6 shows a block diagram 600 of a device 605 that supports person-to-person transfers in accordance with aspects of the present disclosure. The device 605 may include an input interface 610, an output interface 615, and a P2P transaction manager 620. The device 605, or one or more components of the device 605 (e.g., the input interface 610, the output interface 615, and the P2P transaction manager 620), may include at least one processor, which may be coupled with at least one memory, to support the described techniques. Each of these components may communicate, directly or indirectly, with one another (e.g., via one or more buses, communications links, communications interfaces, or any combination thereof).

The input interface 610 may manage input signaling for the user device 605. For example, the input interface 610 may receive input signaling (e.g., messages, packets, data, instructions, commands, transactions, or any other form of encoded information) from other systems or devices. The input interface 610 may send signaling corresponding to (e.g., representative of or otherwise based on) such input signaling to other components of the user device 605 for processing. For example, the input interface 610 may transmit such corresponding signaling to the P2P transaction manager 620 to support person-to-person transfers. In some cases, the input interface 610 may be a component of a 810 as described with reference to FIG. 8.

The output interface 615 may manage output signaling for the user device 605. For example, the output interface 615 may receive signaling from other components of the user device 605, such as the P2P transaction manager 620, and may transmit such output signaling corresponding to (e.g., representative of or otherwise based on) such signaling to other systems or devices. In some cases, the output interface 615 may be a component of a user interface 825 as described with reference to FIG. 8.

For example, the P2P transaction manager 620 may include a request receipt manager 625, a display manager 630, a user input manager 635, a message transmission manager 640, or any combination thereof. In some examples, the P2P transaction manager 620, or various components thereof, may be configured to perform various operations (e.g., receiving, monitoring, transmitting) using or otherwise in cooperation with the input interface 610, the output interface 615, or both. For example, the P2P transaction manager 620 may receive information from the input interface 610, send information to the output interface 615, or be integrated in combination with the input interface 610, the output interface 615, or both to receive information, transmit information, or perform various other operations as described herein.

The P2P transaction manager 620 may support implementing peer-to-peer token requests in accordance with examples as disclosed herein. The request receipt manager 625 may be configured as or otherwise support a means for receiving, at user device of a requestee and from a requestor, a request for transfer of a first amount of a first token to the requestor. The display manager 630 may be configured as or otherwise support a means for displaying, at a blockchain address application associated with the requestee after receiving the request, respective indications of one or more second tokens in the blockchain address application, wherein the one or more second tokens are different than the first token. The user input manager 635 may be configured as or otherwise support a means for receiving user input comprising a selection of a second token of the one or more second tokens. The message transmission manager 640 may be configured as or otherwise support a means for transmitting, after receiving the user input, a message that causes the requestee to transfer a second amount of the selected second token and the requestor to receive the first amount of the first token.

Figure 7:
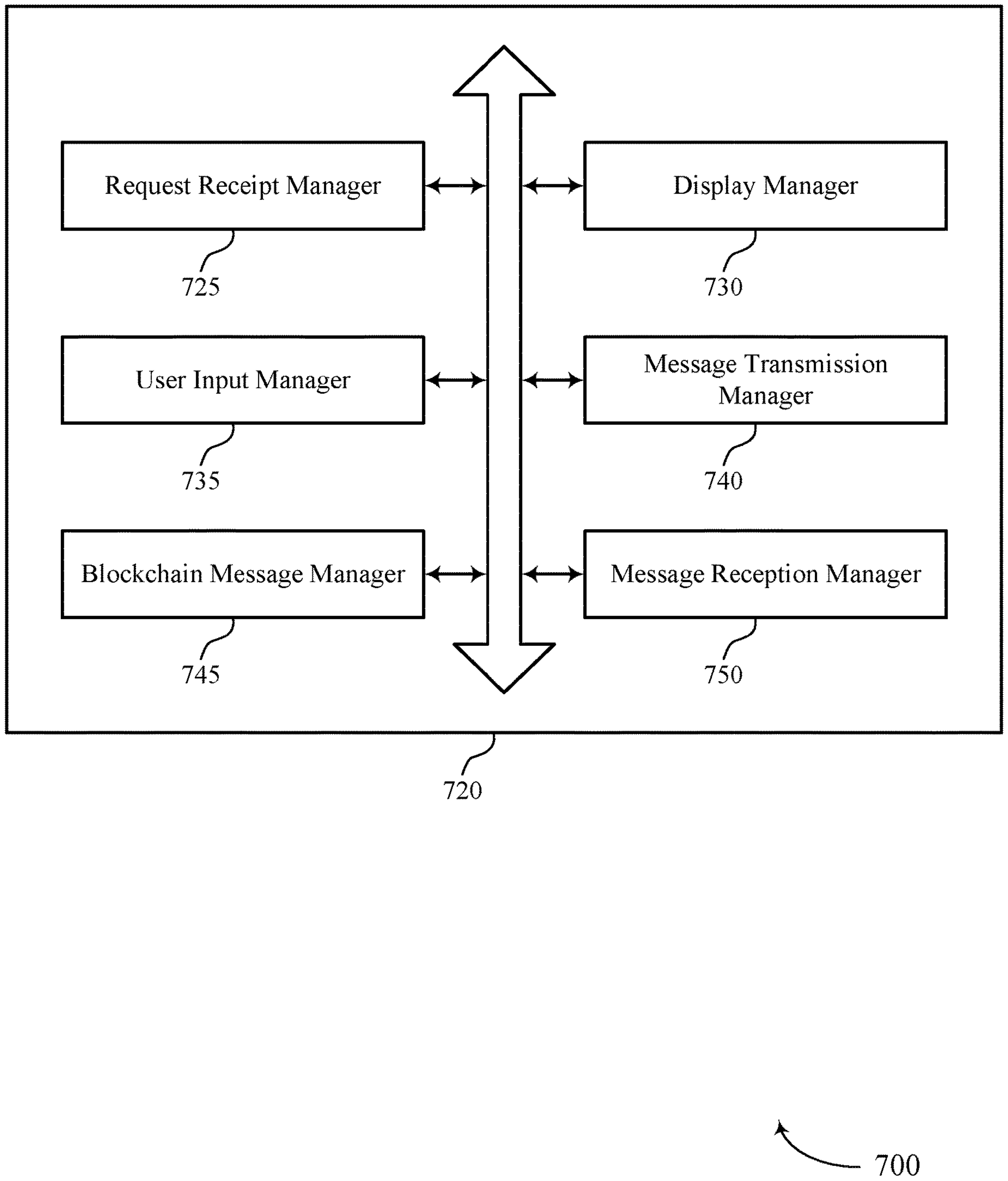
FIG. 7 shows a block diagram of a peer-to-peer manager that supports person-to-person transfers in accordance with aspects of the present disclosure.

FIG. 7 shows a block diagram 700 of a P2P transaction manager 720 that supports person-to-person transfers in accordance with aspects of the present disclosure. The P2P transaction manager 720 may be an example of aspects of a client application or a P2P transaction manager 620, or both, as described herein. The P2P transaction manager 720, or various components thereof, may be an example of means for performing various aspects of person-to-person transfers as described herein. For example, the P2P transaction manager 720 may include a request receipt manager 725, a display manager 730, a user input manager 735, a message transmission manager 740, a blockchain message manager 745, a message reception manager 750, or any combination thereof. Each of these components may communicate, directly or indirectly, with one another (e.g., via one or more buses, communications links, communications interfaces, or any combination thereof).

The P2P transaction manager 720 may support implementing peer-to-peer token requests in accordance with examples as disclosed herein. The request receipt manager 725 may be configured as or otherwise support a means for receiving, at user device of a requestee and from a requestor, a request for transfer of a first amount of a first token to the requestor. The display manager 730 may be configured as or otherwise support a means for displaying, at a blockchain address application associated with the requestee after receiving the request, respective indications of one or more second tokens in the blockchain address application, wherein the one or more second tokens are different than the first token. The user input manager 735 may be configured as or otherwise support a means for receiving user input comprising a selection of a second token of the one or more second tokens. The message transmission manager 740 may be configured as or otherwise support a means for transmitting, after receiving the user input, a message that causes the requestee to transfer a second amount of the selected second token and the requestor to receive the first amount of the first token.

In some examples, to support transmitting the message, the blockchain message manager 745 may be configured as or otherwise support a means for causing a blockchain message to be broadcast on-chain via one or more blockchain networks associated with the first token, the second token, or both, wherein the blockchain message is configured to exchange the second amount of the selected second token for the first amount of the first token and transfer the first amount to a blockchain address associated with the requestor.

In some examples, to support transmitting the message, the message transmission manager 740 may be configured as or otherwise support a means for transmitting, to a custodial token platform associated with the blockchain address application, the message that causes an off-chain transfer of the second amount and receipt of the first amount.

In some examples, the display manager 730 may be configured as or otherwise support a means for displaying, in the blockchain address application associated with the requestee and in response to receiving the selection of the second token, the second amount of the second token that corresponds to the first amount of the first token, wherein the second amount is based at least in part on a current conversion ratio between the second token and the first token.

In some examples, the first token, the second token, or both is a stablecoin.

In some examples, the display manager 730 may be configured as or otherwise support a means for displaying, in response to transmitting the message, a notification indicating the transfer of the second amount of the second token.

In some examples, the one or more second tokens comprise a stablecoin, a layer 1 token, a layer 2 token, a token supported by a self-executing program on a blockchain network, a centralized digital token, or a combination thereof.

In some examples, the display manager 730 may be configured as or otherwise support a means for selecting the one or more second tokens for display based at least in part on a geographic location of the requestee, the requestor, or both.

In some examples, to support receiving the request, the request receipt manager 725 may be configured as or otherwise support a means for receiving the request based at least in part on the request including a phone number associated with the requestee, an email address associated with the requestee, or a combination thereof.

In some examples, to support receiving the request, the message reception manager 750 may be configured as or otherwise support a means for receiving, at the user device, an email or cellular message that is indicative of the requested first amount and the requestor and includes an indication of the blockchain address application that is used to complete the request.

Figure 8:
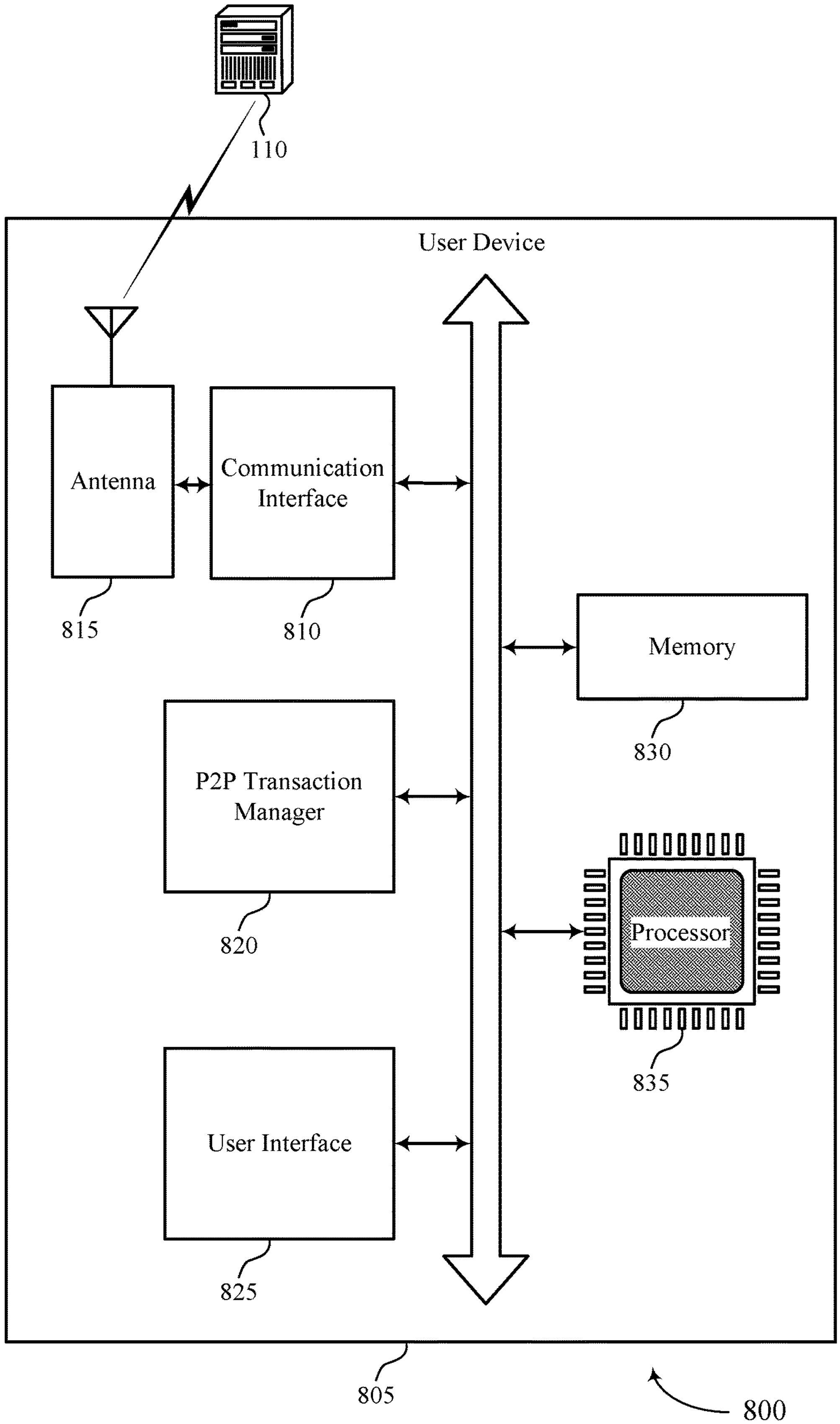
FIG. 8 shows a diagram of a system including a device that supports person-to-person transfers in accordance with aspects of the present disclosure.

FIG. 8 shows a diagram of a system 800 including a device 805 that supports person-to-person transfers in accordance with aspects of the present disclosure. The device 805 may be an example of or include the components of a device 605 as described herein. The device 805 may include components for bi-directional voice and data communications including components for transmitting and receiving communications, such as a P2P transaction manager 820, a communication interface 810, an antenna 815, a user interface 825, at least one memory 830, and at least one processor 835. Each of these components may communicate, directly or indirectly, with one another (e.g., via one or more buses, communications links, communications interfaces, or any combination thereof).

The communication interface 810 may manage input and output signals for the device 805 via the antenna 815. For example, the communication interface 810 may enable the user device 805 to exchange information (e.g., input information, output information, or both) with other systems or devices, such as custodial token platform 110 (e.g., supported by one or more servers), via one or more wired or wireless communication links. The communication interface 810 may also utilize or interact with antenna 815 to support communication with other systems or devices. In some cases, the communication interface 810 may represent a physical connection or port to an external peripheral, such as a hardware wallet device. In some cases, the communication interface 810 may utilize an operating system such as iOS®, ANDROID®, MS-DOS®, MS-WINDOWS®, OS/2®, UNIX®, LINUX®, or another known operating system. The communication interface 810 may be implemented as part of the processor 835.

In some cases, the device 805 may include a single antenna 815. However, in some other cases, the device 805 may have more than one antenna 815, which may be capable of concurrently transmitting or receiving multiple wireless transmissions. The communication interface 810 may communicate bi-directionally, via the one or more antennas 815, wired, or wireless links as described herein. For example, the communication interface 810 may represent a wireless transceiver and may communicate bi-directionally with another wireless transceiver. The communication interface 810 may also include a modem to modulate the packets, to provide the modulated packets to one or more antennas 815 for transmission, and to demodulate packets received from the one or more antennas 815.

The user interface 825 may represent interact with a keyboard, a mouse, a touchscreen, a microphone, or a similar device or component. In some cases, a user may interact with the user interface 825. In other cases, the user interface 825 may operate automatically without user interaction. The user interface 825 may display or output information such as information received from other systems or devices or information to be transmitted to other systems or devices.

The memory 830 may include RAM and ROM. The memory 830 may store computer-readable, computer-executable software including instructions that, when executed, cause at least one processor 835 to perform various functions described herein. In some cases, the memory 830 may contain, among other things, a BIOS which may control basic hardware or software operation such as the interaction with peripheral components or devices. The memory 830 may be an example of a single memory or multiple memories. For example, the user device 805 may include one or more memories 830.

The processor 835 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 835 may be configured to operate a memory array using a memory controller. In other cases, a memory controller may be integrated into the processor 835. The processor 835 may be configured to execute computer-readable instructions stored in at least one memory 830 to perform various functions (e.g., functions or tasks supporting a method and system for person-to-person transfers). Though a single processor 835 is depicted in the example of FIG. 8, it is to be understood that the user device 805 may include any quantity of one or more of processors 835 and that a group of processors 835 may collectively perform one or more functions ascribed herein to a processor, such as the processor 835. The processor 835 may be an example of a single processor or multiple processors. For example, the device 805 may include one or more processors 835.

The P2P transaction manager 820 may support implementing peer-to-peer token requests in accordance with examples as disclosed herein. For example, the P2P transaction manager 820 may be configured as or otherwise support a means for receiving, at user device of a requestee and from a requestor, a request for transfer of a first amount of a first token to the requestor. The P2P transaction manager 820 may be configured as or otherwise support a means for displaying, at a blockchain address application associated with the requestee after receiving the request, respective indications of one or more second tokens in the blockchain address application, wherein the one or more second tokens are different than the first token. The P2P transaction manager 820 may be configured as or otherwise support a means for receiving user input comprising a selection of a second token of the one or more second tokens. The P2P transaction manager 820 may be configured as or otherwise support a means for transmitting, after receiving the user input, a message that causes the requestee to transfer a second amount of the selected second token and the requestor to receive the first amount of the first token.

By including or configuring the P2P transaction manager 820 in accordance with examples as described herein, the device 805 may support techniques for increasing flexibility in payment currency for fulfilling a payment request, resulting in increased likelihood of the requestee fulfilling the request and increased user engagement with the blockchain address application since additional payment options may increase the pool of users having funds in the different currency options. The P2P transaction manager 820 may include an application (e.g., "app"), program, software, extension, or other component which is configured to facilitate communications with a custodial token platform 110 on a server, one or more nodes of a blockchain network 105, other user devices 805, and other devices or systems. For example, the P2P transaction manager 820 may be an application executable on the user device 805, and the P2P transaction manager 820 may be configured to receive data from a custodial token platform 110, transmit data to the custodial token platform 110, process such data, and cause presentation of such data to a user via a user interface 825. The P2P transaction manager 820 may be an example of a wallet application, a wallet device, or both, and may be associated with a wallet address and may access or use a private key to sign messages to facilitate transfer of crypto tokens, messages, transactions, or the like via a blockchain distributed data store.

Figure 9:
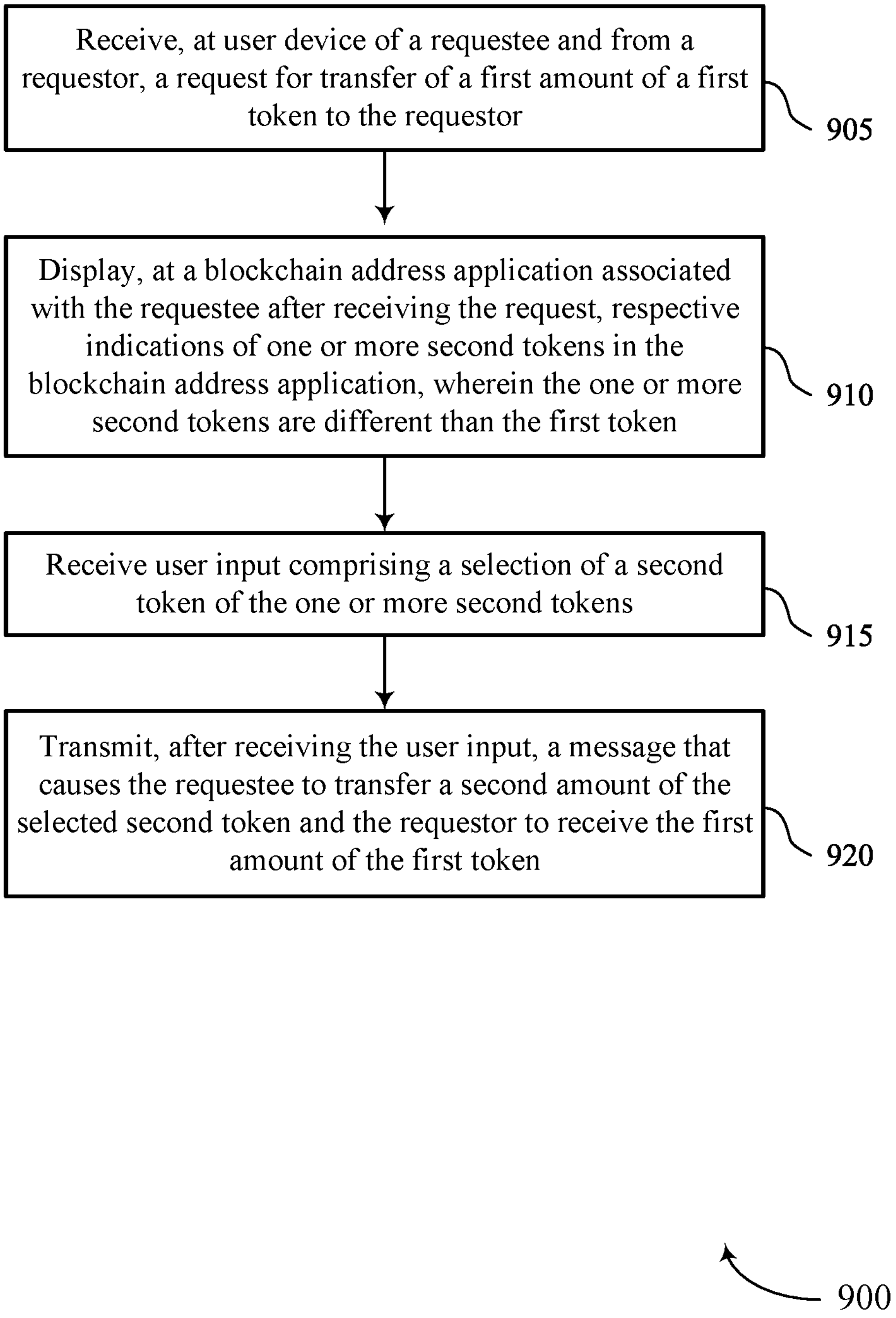
FIGS. 9 through 11 show flowcharts illustrating methods that support person-to-person transfers in accordance with aspects of the present disclosure.

FIG. 9 shows a flowchart illustrating a method 900 that supports person-to-person transfers in accordance with aspects of the present disclosure. The operations of the method 900 may be implemented by a user device or its components as described herein. For example, the operations of the method 900 may be performed by a user device as described with reference to FIGS. 1 through 8. In some examples, a user device may execute a set of instructions to control the functional elements of the user device to perform the described functions. Additionally, or alternatively, the user device may perform aspects of the described functions using special-purpose hardware.

At 905, the method may include receiving, at user device of a requestee and from a requestor, a request for transfer of a first amount of a first token to the requestor. The operations of block 905 may be performed in accordance with examples as disclosed herein. In some examples, aspects of the operations of 905 may be performed by a request receipt manager 725 as described with reference to FIG. 7.

At 910, the method may include displaying, at a blockchain address application associated with the requestee after receiving the request, respective indications of one or more second tokens in the blockchain address application, wherein the one or more second tokens are different than the first token. The operations of block 910 may be performed in accordance with examples as disclosed herein. In some examples, aspects of the operations of 910 may be performed by a display manager 730 as described with reference to FIG. 7.

At 915, the method may include receiving user input comprising a selection of a second token of the one or more second tokens. The operations of block 915 may be performed in accordance with examples as disclosed herein. In some examples, aspects of the operations of 915 may be performed by a user input manager 735 as described with reference to FIG. 7.

At 920, the method may include transmitting, after receiving the user input, a message that causes the requestee to transfer a second amount of the selected second token and the requestor to receive the first amount of the first token. The operations of block 920 may be performed in accordance with examples as disclosed herein. In some examples, aspects of the operations of 920 may be performed by a message transmission manager 740 as described with reference to FIG. 7.

Figure 10:
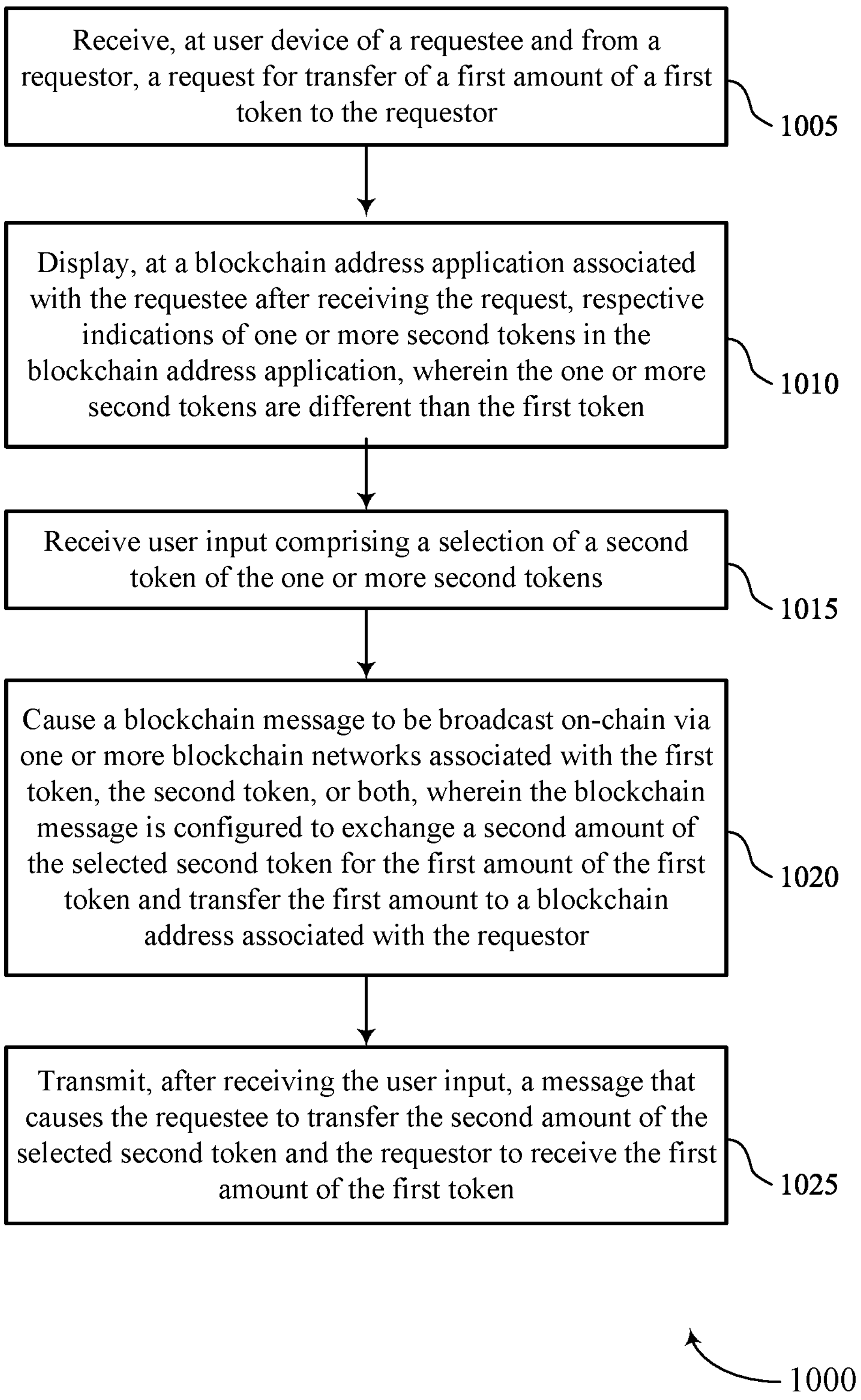

FIG. 10 shows a flowchart illustrating a method 1000 that supports person-to-person transfers in accordance with aspects of the present disclosure. The operations of the method 1000 may be implemented by a user device or its components as described herein. For example, the operations of the method 1000 may be performed by a user device as described with reference to FIGS. 1 through 8. In some examples, a user device may execute a set of instructions to control the functional elements of the user device to perform the described functions. Additionally, or alternatively, the user device may perform aspects of the described functions using special-purpose hardware.

At 1005, the method may include receiving, at user device of a requestee and from a requestor, a request for transfer of a first amount of a first token to the requestor. The operations of block 1005 may be performed in accordance with examples as disclosed herein. In some examples, aspects of the operations of 1005 may be performed by a request receipt manager 725 as described with reference to FIG. 7.

At 1010, the method may include displaying, at a blockchain address application associated with the requestee after receiving the request, respective indications of one or more second tokens in the blockchain address application, wherein the one or more second tokens are different than the first token. The operations of block 1010 may be performed in accordance with examples as disclosed herein. In some examples, aspects of the operations of 1010 may be performed by a display manager 730 as described with reference to FIG. 7.

At 1015, the method may include receiving user input comprising a selection of a second token of the one or more second tokens. The operations of block 1015 may be performed in accordance with examples as disclosed herein. In some examples, aspects of the operations of 1015 may be performed by a user input manager 735 as described with reference to FIG. 7.

At 1020, the method may include causing a blockchain message to be broadcast on-chain via one or more blockchain networks associated with the first token, the second token, or both, wherein the blockchain message is configured to exchange the second amount of the selected second token for the first amount of the first token and transfer the first amount to a blockchain address associated with the requestor. The operations of block 1020 may be performed in accordance with examples as disclosed herein. In some examples, aspects of the operations of 1020 may be performed by a blockchain message manager 745 as described with reference to FIG. 7.

At 1025, the method may include transmitting, after receiving the user input, a message that causes the requestee to transfer a second amount of the selected second token and the requestor to receive the first amount of the first token. The operations of block 1025 may be performed in accordance with examples as disclosed herein. In some examples, aspects of the operations of 1025 may be performed by a message transmission manager 740 as described with reference to FIG. 7.

Figure 11:
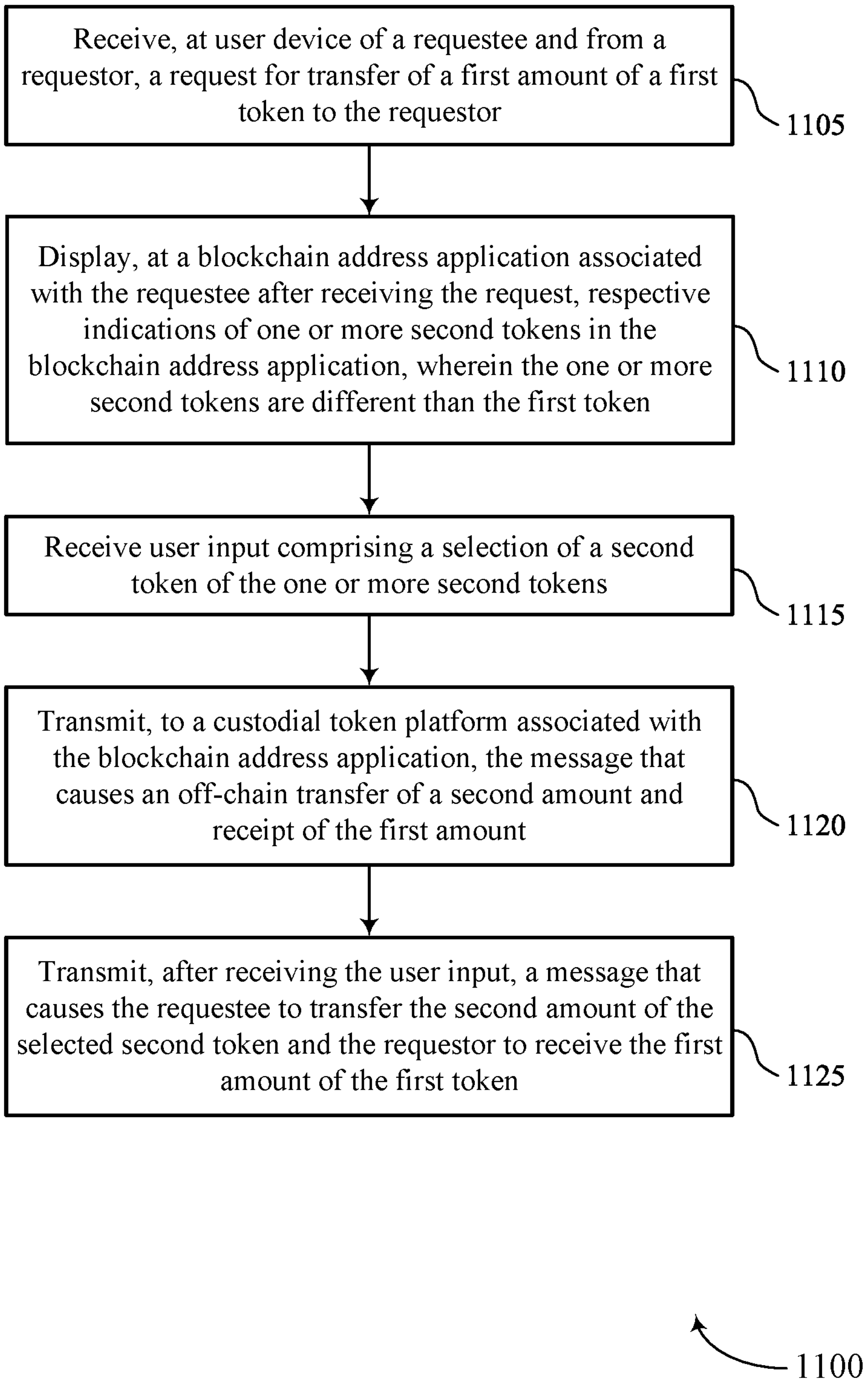

FIG. 11 shows a flowchart illustrating a method 1100 that supports person-to-person transfers in accordance with aspects of the present disclosure. The operations of the method 1100 may be implemented by a user device or its components as described herein. For example, the operations of the method 1100 may be performed by a user device as described with reference to FIGS. 1 through 8. In some examples, a user device may execute a set of instructions to control the functional elements of the user device to perform the described functions. Additionally, or alternatively, the user device may perform aspects of the described functions using special-purpose hardware.

At 1105, the method may include receiving, at user device of a requestee and from a requestor, a request for transfer of a first amount of a first token to the requestor. The operations of block 1105 may be performed in accordance with examples as disclosed herein. In some examples, aspects of the operations of 1105 may be performed by a request receipt manager 725 as described with reference to FIG. 7.

At 1110, the method may include displaying, at a blockchain address application associated with the requestee after receiving the request, respective indications of one or more second tokens in the blockchain address application, wherein the one or more second tokens are different than the first token. The operations of block 1110 may be performed in accordance with examples as disclosed herein. In some examples, aspects of the operations of 1110 may be performed by a display manager 730 as described with reference to FIG. 7.

At 1115, the method may include receiving user input comprising a selection of a second token of the one or more second tokens. The operations of block 1115 may be performed in accordance with examples as disclosed herein. In some examples, aspects of the operations of 1115 may be performed by a user input manager 735 as described with reference to FIG. 7.

At 1120, the method may include transmitting, to a custodial token platform associated with the blockchain address application, the message that causes an off-chain transfer of the second amount and receipt of the first amount. The operations of block 1120 may be performed in accordance with examples as disclosed herein. In some examples, aspects of the operations of 1120 may be performed by a message transmission manager 740 as described with reference to FIG. 7.

At 1125, the method may include transmitting, after receiving the user input, a message that causes the requestee to transfer a second amount of the selected second token and the requestor to receive the first amount of the first token. The operations of block 1125 may be performed in accordance with examples as disclosed herein. In some examples, aspects of the operations of 1125 may be performed by a message transmission manager 740 as described with reference to FIG. 7.

A method for implementing peer-to-peer token requests by an apparatus is described. The method may include receiving, at user device of a requestee and from a requestor, a request for transfer of a first amount of a first token to the requestor, displaying, at a blockchain address application associated with the requestee after receiving the request, respective indications of one or more second tokens in the blockchain address application, wherein the one or more second tokens are different than the first token, receiving user input comprising a selection of a second token of the one or more second tokens, and transmitting, after receiving the user input, a message that causes the requestee to transfer a second amount of the selected second token and the requestor to receive the first amount of the first token.

An apparatus for implementing peer-to-peer token requests is described. The apparatus may include one or more memories storing processor executable code, and one or more processors coupled with the one or more memories. The one or more processors may individually or collectively operable to execute the code to cause the apparatus to receive, at user device of a requestee and from a requestor, a request for transfer of a first amount of a first token to the requestor, display, at a blockchain address application associated with the requestee after receiving the request, respective indications of one or more second tokens in the blockchain address application, wherein the one or more second tokens are different than the first token, receive user input comprising a selection of a second token of the one or more second tokens, and transmit, after receiving the user input, a message that causes the requestee to transfer a second amount of the selected second token and the requestor to receive the first amount of the first token.

Another apparatus for implementing peer-to-peer token requests is described. The apparatus may include means for receiving, at user device of a requestee and from a requestor, a request for transfer of a first amount of a first token to the requestor, means for displaying, at a blockchain address application associated with the requestee after receiving the request, respective indications of one or more second tokens in the blockchain address application, wherein the one or more second tokens are different than the first token, means for receiving user input comprising a selection of a second token of the one or more second tokens, and means for transmitting, after receiving the user input, a message that causes the requestee to transfer a second amount of the selected second token and the requestor to receive the first amount of the first token.

A non-transitory computer-readable medium storing code for implementing peer-to-peer token requests is described. The code may include instructions executable by one or more processors to receive, at user device of a requestee and from a requestor, a request for transfer of a first amount of a first token to the requestor, display, at a blockchain address application associated with the requestee after receiving the request, respective indications of one or more second tokens in the blockchain address application, wherein the one or more second tokens are different than the first token, receive user input comprising a selection of a second token of the one or more second tokens, and transmit, after receiving the user input, a message that causes the requestee to transfer a second amount of the selected second token and the requestor to receive the first amount of the first token.

In some examples of the method, apparatus, and non-transitory computer-readable medium described herein, transmitting the message may include operations, features, means, or instructions for causing a blockchain message to be broadcast on-chain via one or more blockchain networks associated with the first token, the second token, or both, wherein the blockchain message may be configured to exchange the second amount of the selected second token for the first amount of the first token and transfer the first amount to a blockchain address associated with the requestor.

In some examples of the method, apparatus, and non-transitory computer-readable medium described herein, transmitting the message may include operations, features, means, or instructions for transmitting, to a custodial token platform associated with the blockchain address application, the message that causes an off-chain transfer of the second amount and receipt of the first amount.

Some examples of the method, apparatus, and non-transitory computer-readable medium described herein may further include operations, features, means, or instructions for displaying, in the blockchain address application associated with the requestee and in response to receiving the selection of the second token, the second amount of the second token that corresponds to the first amount of the first token, wherein the second amount may be based at least in part on a current conversion ratio between the second token and the first token.

In some examples of the method, apparatus, and non-transitory computer-readable medium described herein, the first token, the second token, or both may be a stablecoin.

Some examples of the method, apparatus, and non-transitory computer-readable medium described herein may further include operations, features, means, or instructions for displaying, in response to transmitting the message, a notification indicating the transfer of the second amount of the second token.

In some examples of the method, apparatus, and non-transitory computer-readable medium described herein, the one or more second tokens comprise a stablecoin, a layer 1 token, a layer 2 token, a token supported by a self-executing program on a blockchain network, a centralized digital token, or a combination thereof.

Some examples of the method, apparatus, and non-transitory computer-readable medium described herein may further include operations, features, means, or instructions for selecting the one or more second tokens for display based at least in part on a geographic location of the requestee, the requestor, or both.

In some examples of the method, apparatus, and non-transitory computer-readable medium described herein, receiving the request may include operations, features, means, or instructions for receiving the request based at least in part on the request including a phone number associated with the requestee, an email address associated with the requestee, or a combination thereof.

In some examples of the method, apparatus, and non-transitory computer-readable medium described herein, receiving the request may include operations, features, means, or instructions for receiving, at the user device, an email or cellular message that may be indicative of the requested first amount and the requestor and includes an indication of the blockchain address application that may be used to complete the request.

In some examples of the method, apparatus, and non-transitory computer-readable medium described herein, the one or more second tokens are displayed based on the requestee being associated with less than the first amount of the first token.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for implementing peer-to-peer token requests, comprising:

receiving, at a user device of a requestee and from a requestor, a request for a transfer of a first amount of a first token to the requestor, wherein a state of the request comprises a first state;

displaying, at a blockchain address application associated with the requestee after receiving the request, respective indications of one or more second tokens in the blockchain address application, wherein the one or more second tokens are different than the first token;

receiving user input comprising a selection of a second token of the one or more second tokens;

transmitting, based at least in part on receiving the user input and via one or more application programming interfaces (APIs) associated with the blockchain address application, a request for a current conversion ratio between the second token and the first token;

receiving an indication of the current conversion ratio;

displaying, in the blockchain address application associated with the requestee and after receiving the selection of the second token, a second amount of the second token that corresponds to the first amount of the first token, wherein the second amount is based at least in part on the current conversion ratio between the second token and the first token;

transmitting, based at least in part on displaying the second amount of the second token and to a server, a message that initiates a payment, wherein the message requests the server to generate a payment request that transfers the second amount of the second token from the requestee and transfers the first amount of the first token to the requestor based at least in part on the current conversion ratio and wherein transmitting the message transitions the state of the request from the first state to a second state;

receiving, via the one or more APIs, data indicating the second state of the payment request from the server, wherein the data is delivered by a notification service that subscribes to state data associated with the payment request at the server and pushes updates to the blockchain address application; and triggering display, in the blockchain address application, of the second state of the transfer based at least in part on the received data.

2. The method of claim 1, wherein transmitting the message comprises:

transmitting the message that initiates the payment, wherein the message indicates for the server to broadcast a blockchain message on-chain via one or more blockchain networks associated with the first token, the second token, or both, wherein the blockchain message exchanges the second amount of the selected second token for the first amount of the first token and transfers the first amount to a blockchain address associated with the requestor.

3. The method of claim 1, wherein transmitting the message comprises:

transmitting, to a custodial token platform supported by the server, wherein the custodial token platform is associated with the blockchain address application, the message that indicates for the custodial token platform to initiate an off-chain transfer of the second amount and receipt of the first amount.

4. The method of claim 1, wherein the first token, the second token, or both is a stablecoin.

5. The method of claim 1, further comprising:

displaying, in response to transmitting the message, a notification indicating the transfer of the second amount of the second token.

6. The method of claim 1, wherein the one or more second tokens comprise a stablecoin, a layer 1 token, a layer 2 token, a token supported by a self-executing program on a blockchain network, a centralized digital token, or a combination thereof.

7. The method of claim 1, further comprising:

selecting the one or more second tokens for display based at least in part on a geographic location of the requestee, the requestor, or both.

8. The method of claim 1, wherein receiving the request comprises:

receiving the request based at least in part on the request including a phone number associated with the requestee, an email address associated with the requestee, or a combination thereof.

9. The method of claim 1, wherein receiving the request comprises:

receiving, at the user device, an email or cellular message that is indicative of the requested first amount and the requestor and includes an indication of the blockchain address application that is used to complete the request.

10. The method of claim 1, wherein the one or more second tokens are displayed based at least in part on the requestee having a second amount of the first token that is less than the first amount of the first token or having no amount of the first token.

11. An apparatus for implementing peer-to-peer token requests, comprising:

one or more memories storing processor-executable code; and one or more processors coupled with the one or more memories and individually or collectively operable to execute the code to cause the apparatus to:

receive, at a user device of a requestee and from a requestor, a request for a transfer of a first amount of a first token to the requestor, wherein a state of the request comprises a first state;

display, at a blockchain address application associated with the requestee after receiving the request, respective indications of one or more second tokens in the blockchain address application, wherein the one or more second tokens are different than the first token;

receive user input comprising a selection of a second token of the one or more second tokens;

transmit, based at least in part on receiving the user input and via one or more application programming interfaces (APIs) associated with the blockchain address application, a request for a current conversion ratio between the second token and the first token;

receive an indication of the current conversion ratio;

display, in the blockchain address application associated with the requestee and after receiving the selection of the second token, a second amount of the second token that corresponds to the first amount of the first token, wherein the second amount is based at least in part on the current conversion ratio between the second token and the first token;

transmit, based at least in part on displaying the second amount of the second token and to a server, a message that initiates a payment, wherein the message requests the server to generate a payment request that transfers the second amount of the second token from the requestee and transfers the first amount of the first token to the requestor based at least in part on the current conversion ratio and wherein transmitting the message transitions the state of the request from the first state to a second state;

receive, via the one or more APIs, data indicating the second state of the payment request from the server, wherein the data is delivered by a notification service that subscribes to state data associated with the payment request at the server and pushes updates to the blockchain address application; and trigger display, in the blockchain address application, of the second state of the transfer based at least in part on the received data.

12. The apparatus of claim 11, wherein, to transmit the message, the one or more processors are individually or collectively operable to execute the code to cause the apparatus to:

transmit the message that initiates the payment, wherein the message indicates for the server to broadcast a blockchain message on-chain via one or more blockchain networks associated with the first token, the second token, or both, wherein the blockchain message exchanges the second amount of the selected second token for the first amount of the first token and transfers the first amount to a blockchain address associated with the requestor.

13. The apparatus of claim 11, wherein, to transmit the message, the one or more processors are individually or collectively operable to execute the code to cause the apparatus to:

transmit, to a custodial token platform supported by the server, wherein the custodial token platform is associated with the blockchain address application, the message that indicates for the custodial token platform to initiate an off-chain transfer of the second amount and receipt of the first amount.

14. The apparatus of claim 11, wherein the first token, the second token, or both is a stablecoin.

15. The apparatus of claim 11, wherein the one or more processors are individually or collectively further operable to execute the code to cause the apparatus to:

display, in response to transmitting the message, a notification indicating the transfer of the second amount of the second token.

16. The apparatus of claim 11, wherein the one or more second tokens comprise a stablecoin, a layer 1 token, a layer 2 token, a token supported by a self-executing program on a blockchain network, a centralized digital token, or a combination thereof.

17. A non-transitory computer-readable medium storing code for implementing peer-to-peer token requests, the code comprising instructions executable by one or more processors to:

receive, at a user device of a requestee and from a requestor, a request for a transfer of a first amount of a first token to the requestor, wherein a state of the request comprises a first state;

display, at a blockchain address application associated with the requestee after receiving the request, respective indications of one or more second tokens in the blockchain address application, wherein the one or more second tokens are different than the first token;

receive user input comprising a selection of a second token of the one or more second tokens;

transmit, based at least in part on receiving the user input and via one or more application programming interfaces (APIs) associated with the blockchain address application, a request for a current conversion ratio between the second token and the first token;

receive an indication of the current conversion ratio;

display, in the blockchain address application associated with the requestee and after receiving the selection of the second token, a second amount of the second token that corresponds to the first amount of the first token, wherein the second amount is based at least in part on the current conversion ratio between the second token and the first token;

transmit, based at least in part on displaying the second amount of the second token and to a server, a message that initiates a payment, wherein the message requests the server to generate a payment request that transfers the second amount of the second token from the requestee and transfers the first amount of the first token to the requestor based at least in part on the current conversion ratio and wherein transmitting the message transitions the state of the request from the first state to a second state;

receive, via the one or more APIs, data indicating the second state of the payment request from the server, wherein the data is delivered by a notification service that subscribes to state data associated with the payment request at the server and pushes updates to the blockchain address application; and trigger display, in the blockchain address application, of the second state of the transfer based at least in part on the received data.

18. The non-transitory computer-readable medium of claim 17, wherein the instructions to receive the request are executable by the one or more processors to:

receive the request based at least in part on the request including a phone number associated with the requestee, an email address associated with the requestee, or a combination thereof.

* * * * *